US008386899B2

(12) United States Patent
Goto et al.

(10) Patent No.: US 8,386,899 B2

(45) Date of Patent: Feb. 26, 2013

(54) QUANTUM COMPUTING METHOD AND A QUANTUM COMPUTER

(75) Inventors: Hayato Goto, Kanagawa-ken (JP); Kouichi Ichimura, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 524 days.

(21) Appl. No.: 12/731,277

(22) Filed: Mar. 25, 2010

(65) Prior Publication Data

US 2010/0251049 A1 Sep. 30, 2010

(30) Foreign Application Priority Data

Mar. 27, 2009 (JP) ................................ 2009-079789

(51) Int. Cl.
*G06F 11/00* (2006.01)
*G06F 15/00* (2006.01)

(52) U.S. Cl. ........................................... 714/799; 712/1

(58) Field of Classification Search ........................ None
See application file for complete search history.

(56) References Cited

U.S. PATENT DOCUMENTS

| | | | | |
|---|---|---|---|---|
| 6,456,994 | B1 * | 9/2002 | Tucci | 706/52 |
| 7,126,106 | B2 | 10/2006 | Goto et al. | |
| 7,180,645 | B2 * | 2/2007 | Azuma | 359/107 |
| 7,184,555 | B2 * | 2/2007 | Whaley et al. | 380/278 |
| 7,219,017 | B2 * | 5/2007 | Vitaliano et al. | 702/19 |
| 7,451,292 | B2 * | 11/2008 | Routt | 712/14 |

OTHER PUBLICATIONS

"Single qubit, two qubit gates and no signalling principle" by Chakrabarty, I Romanian Journal of Physics , vol. 54 , No. 3-4 , pp. 289-300 Date 2009.*

Maunz, P.; Olmschenk, S.; Hayes, D.; Matsukevich, D.N.; Duan, L.-M.; Monroe, C.; , "Teleportation of quantum information between distant atomic qubits," Lasers and Electro-Optics, 2009 and 2009 Conference on Quantum electronics and Laser Science Conference. CLEO/QELS 2009. Conference on , vol., no., pp. 1, Jun. 2-4, 2009.*

U.S. Appl. No. 13/050,628, filed Mar. 17, 2011, Nakamura, et al.

Duan, L.-M., et al., "Robust quantum gates on neutral atoms with cavity-assited photon scattering," Phyical Review A 72.032333, 2005, 4 pages.

Knill, E., "Quantum computing with realistically noisy devices," Nature, vol. 434, Mar. 3, 2005, p. 39-44.

Gottesman, Daniel, et al., "Demonstrating the viability of universal quantum computation using teleportation and single-qubit operations," Nature, vol. 402, Nov. 25, 1999, p. 390-393.

* cited by examiner

*Primary Examiner* — Cynthia Britt

(74) *Attorney, Agent, or Firm* — Oblon, Spivak, McClelland, Maier & Neustadt, L.L.P.

(57) ABSTRACT

In an operation of two qubit gate having failure information related to success or failure, by using a code to concatenate N-error-correcting code transversally executing a Pauli gate, a Hadamard gate and a CNOT gate, an error-correction is executed by an error-correcting teleportation, and the CNOT gate is executed to an encoded qubit by the error-correcting teleportation. In Bell measurement of the error-correcting teleportation, when a measurement result of non-encoded qubit is processed, by suitably defining failure information of the encoded qubit of level (l+1) from the failure information of encoded qubits of level l, the measurement result of the encoded qubit of each level is determined, and the failure information of the encoded qubit of each level is defined. As a result, a measurement result of a logical qubit as the encoded qubit of the highest level is determined.

17 Claims, 10 Drawing Sheets

QUANTUM COMPUTING METHOD AND A QUANTUM COMPUTER

CROSS-REFERENCE TO RELATED APPLICATIONS

This application is based upon and claims the benefit of priority from Japanese Patent Application No. 2009-079789, filed on Mar. 27, 2009; the entire contents of which are incorporated herein by reference.

FIELD OF THE INVENTION

The present invention relates to a quantum computing method and a quantum computer using a quantum error-correction.

BACKGROUND OF THE INVENTION

Recently, a quantum computer has extensively been studied. In comparison with present computation (classical computation), in quantum computing, memory errors occur by decoherence, and a gate operation having high reliability is difficult. Accordingly, error-correction is extremely important. As to the theory of quantum error-correction, by using a quantum error-correcting code, a rapid rise of error probability of computing result with increase of computational complexity can be suppressed. In this way, computing with error-correction is called “fault tolerant computing”.

As a result, if the probabilities of fundamental errors (memory error, error of one-qubit gate, error of two-qubit gate, error of initialization of qubit, error of measurement of qubit) are lower than some value (it is called a threshold), error probability of final computing result can be lowered to any degree (Briefly, a long computing can be performed to any degree). This is called “a threshold theorem”, which is the most important result in quantum information science.

From a view point of the threshold theorem, the reason why realization of a quantum computer is difficult at present is that the probabilities of fundamental errors are difficult to be smaller than the threshold. Accordingly, if the threshold can be raised by contriving the error-correction method, realization of the quantum computer will be easier.

The threshold was estimated as a very small value such as $10^{-4}$~$10^{-6}$. Recently, it is known that the threshold can be raise to $10^{-2}$~$10^{-3}$. For example, this fact is disclosed in the following references.

[Non-patent reference 1] M. A. Steane, Phys. Rev. A68, 042322 (2003)

[Non-patent reference 2] E. Knill, Nature 434, 39 (2005).

[Non-patent reference 3] B. W. Reichardt, e-print arXiv: quant-ph/0406025

Such a value is still very low. In addition, the present approaches have a problem that a high threshold cannot be realized by few resources.

SUMMARY OF THE INVENTION

The present invention is directed to a quantum computing method and a quantum computer for realizing a high threshold used for fault tolerant quantum computation, by few resources.

According to an aspect of the present invention, there is provided a quantum computing method comprising: operating two qubit gate on two qubits, the two qubit gate having failure information related to success and failure (the failure information suggesting success is S, the failure information suggesting failure is F); when the failure information is F(S), defining failure information of the two qubits as F(S); executing an error-correction by an error-correcting teleportation, using a code to concatenate N-error-correcting code (N: an integral number equal to or larger than one) transversally executing a Pauli gate, a Hadamard gate and a controlled-NOT gate (called a CNOT gate); executing the CNOT gate (called an encoded CNOT gate) to an encoded qubit by the error-correcting teleportation using $|\chi\rangle \equiv |0000\rangle+|0011\rangle+|1101\rangle+|1110\rangle$; when a measurement result of non-encoded qubit (called a physical qubit, a gate of the physical qubit is called a physical gate) is processed (at level 0 (l=0), the encoded qubit is replaced with the physical qubit, and the encoded CNOT gate is replaced with a physical CNOT gate) in Bell measurement of the error-correcting teleportation, determining the measurement result and defining the failure information of the encoded qubit of each level by (1)~(4), (1) If all of encoded qubits of level l (l: an integral number equal to or larger than one) composing an encoded qubit of level (l+1) have failure information S, a measured value of the encoded qubit of level (l+1) is determined by N-error-correction, and failure information of the encoded qubit of level (l+1) is defined as S. (2) If the number of encoded qubits of level l with failure information F composing an encoded qubit of level (l+1) is 1~N, a measured value of the encoded qubit of level (l+1) is determined by N-error-correction and ignoring the failure information, and failure information of the encoded qubit of level (l+1) is defined as S. (3) If the number of encoded qubits of level l with failure information F composing an encoded qubit of level (l+1) is (N+1)~2N. (3-1) If a syndrome as 2N erasure error-correcting code represents no error or that only qubit having failure information F has an error, a measured value of the encoded qubit of level (l+1) is determined by correcting the error, and failure information of the encoded qubit of level (l+1) is defined as S. (3-2) If a syndrome as 2N erasure error-correcting code represents an error and that a qubit having failure information S has an error, a measured value of the encoded qubit of level (l+1) is determined by N-error-correction and ignoring the failure information, and failure information of the encoded qubit of level (l+1) is defined as F. (4) If the number of the encoded qubits of level l with failure information F composing an encoded qubit of level (l+1) is equal to or larger than (2N+1), a measured value of the encoded qubit of level (l+1) is determined by N-error-correction and ignoring the failure information, and failure information of the encoded qubit of level (l+1) is defined as F.; wherein the measurement result of a logical qubit as the encoded qubit of the highest level is determined.

DETAILED DESCRIPTION OF THE EMBODIMENTS

Figure 1:
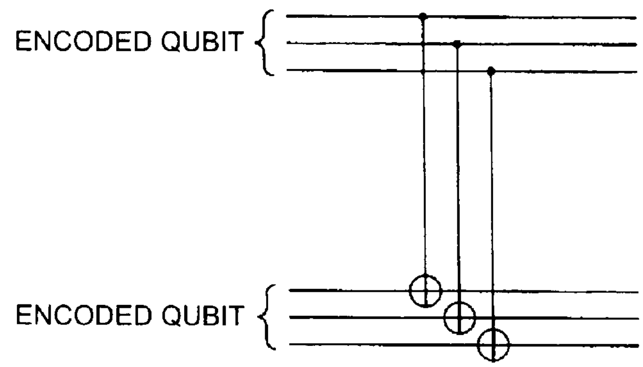
FIG. 1 is one example of a transversal CNOT gate in the case of encoding three qubits to one qubit.

Hereinafter, embodiments of the present invention will be explained by referring to the drawings. The present invention is not limited to the following embodiments. Hereinafter, as to parts to which the same number is assigned, the same operation is executed, and overlapped explanation is omitted.

A theoretically estimated value of threshold depends on the following factors.

1. Quantum error-correcting code
2. Error model
3. Method of fault-tolerant quantum computing In the quantum computing method of the present invention, as to the quantum error-correcting code, a known one is used (detail is explained afterwards). The error model is regularly assumed as much as general one. However, in the present invention, a special one is considered (explained afterwards). As to method of fault tolerant quantum computing, a method which is the error-correcting teleportation (For example, refer to E. Knill, Phys. Rev. A71, 042322 (2005)) improved for above-mentioned special model is used. Hereinafter, first, the error model assumed in the present invention is explained in detail. Next, the method of fault tolerant quantum computing of the present invention is explained. In the explanation, the quantum error-correcting codes used are also explained.

<Error Model Assumed in Quantum Computing Method of the Present Invention>

In the quantum computing method of the present invention, as a method for two-qubit gates, a method accompanied by information (It is called “failure information”) related to success or failure is used. Hereinafter, failure information suggesting a failure is represented as F, and failure information suggesting a success is represented as S. When a success probability is exactly “1” in the case of the failure information S, an error position can be known by the failure information. This type of error is called an erasure error.

As above-mentioned method, the method using optical cavities and single photons (proposed by Duan et al.) is known (Refer to L.-M. Duan, B. Wang, H. J. Kimble, Phys. Rev. A72, 032333 (2005)). As to the Duan method, when the gate operation is performed, a single photon irradiated is detected. If the photon is detected, the two-qubit gate succeeds with high probability. If the photon is not detected, two qubit gate fails with high probability. The detection result of the photon is the failure information. In the quantum computing method of the present invention, on the assumption that such special two-qubit gates are used, a quantum error-correction method suitable for the two-qubit gates is proposed, and the high threshold is realized by the quantum error-correction method.

For the two-qubit gate having the failure information, the probability that the failure information is F is represented as $P_F$, which is called a failure probability of gate. The error probability on the condition that the failure information is F is represented as $P_{Fe}$, and the failure probability on condition that the failure information is S is represented as $P_{Se}$. In this way, the two-qubit gate having the failure information is characterized by the three probabilities $P_F$, $P_{Fe}$ and $P_{Se}$. By definition of the failure information, it is assumed that $P_{Fe} \gg P_{Se}$. In the case of ignoring the failure information, the error probability (sum of the error probabilities in the cases of the failure information S and F) is represented as the following (1).

$$P_F P_{Fe} + (1-P_F) P_{Se} \tag{1}$$

Especially, in the case that $P_{Se}$ is very small and $P_{Fe}$ is near 1, above-mentioned (1) is represented as the following (2).

$$P_F P_{Fe} + (1-P_F) P_{Se} \approx P_F \tag{2}$$

Here, assume that the conventional method of quantum error-correction is used by ignoring the failure information (not by using the method of the present invention). A condition of the threshold is “PF is smaller than conventional threshold $10^{-2}$~$10^{-3}$”. As to notation “A~B”, if A and B are numerical values, “~” is used as a meaning “from A to B”. In the case of above-mentioned Duan's method, this condition leads to a strict condition that relaxation (meaning both relaxation of excited states of atoms and relaxation of cavity modes of optical cavities) should be very slow is charged. As explained afterwards, by using method of the present invention, a threshold of $P_F$ can be greatly higher than the threshold $10^{-2}$~$10^{-3}$.

As an above-mentioned two qubit gate having the failure information, in addition to above-mentioned gate of Duan, a gate of quantum computing with linear-optical elements proposed by Knill is well known (For example, refer to E. Knill, R. Laflamme, and G. J. Milburn, Nature 409, 46 (2001)). As to this gate, the failure probability is theoretically very high, and various ideas to perform fault-tolerant computation for the high failure probability are proposed. Especially, it is effective to use an entangled state called “cluster state”. By combining this idea with various methods, it is shown that the comparatively high threshold is achieved (For example, refer to C. M. Dawson, H. L. Haselgrove, and M. A. Nielsen, Phys. Rev. A73, 052306 (2006)). The Dawson method is similar to the method of the present invention. However, in this method, the use of the cluster state is essential, and a method particular to linear-optics quantum computation is used. Accordingly, this method is different from the present invention (detail of error-correction method is also different). In the present invention, by applying the method of cluster state, a threshold for the failure probability can be raised. This aspect is explained afterwards. First, a method not using the cluster state is explained.

In addition to the above-mentioned assumption related to two-qubit gates, as to the error model considered hereinafter, the following two matters are assumed.

1. Errors of two-qubit gates are modeled by what we call “depolarizing model”. Here, in the “depolarizing model”

Pauli errors occur with an equal probability. Errors of a two-qubit gate for the j-th qubit and the k-th qubit are defined as the following (3).

$$\rho \to (1-p_e)\rho + \frac{p_e}{15}(X_j\otimes I_k)\rho(X_j\otimes I_k) + \frac{p_e}{15}(Y_j\otimes I_k)\rho(Y_j\otimes I_k) + \frac{p_e}{15}(Z_j\otimes I_k)\rho(Z_j\otimes I_k) + \frac{p_e}{15}(I_j\otimes X_k)\rho(I_j\otimes X_k) + \frac{p_e}{15}(X_j\otimes X_k)\rho(X_j\otimes X_k) + \frac{p_e}{15}(Y_j\otimes X_k)\rho(Y_j\otimes X_k) + \frac{p_e}{15}(Z_j\otimes X_k)\rho(Z_j\otimes X_k) + \frac{p_e}{15}(I_j\otimes Y_k)\rho(I_j\otimes Y_k) + \frac{p_e}{15}(X_j\otimes Y_k)\rho(X_j\otimes Y_k) + \frac{p_e}{15}(Y_j\otimes Y_k)\rho(Y_j\otimes Y_k) + \frac{p_e}{15}(Z_j\otimes Y_k)\rho(Z_j\otimes Y_k) + \frac{p_e}{15}(I_j\otimes Z_k)\rho(I_j\otimes Z_k) + \frac{p_e}{15}(X_j\otimes Z_k)\rho(X_j\otimes Z_k) + \frac{p_e}{15}(Y_j\otimes Z_k)\rho(Y_j\otimes Z_k) + \frac{p_e}{15}(Z_j\otimes Z_k)\rho(Z_j\otimes Z_k) \quad (3)$$

Here, the error probability is $P_e$, the identity operator and the Pauli operators for the j-th qubit are $I_j$, $X_j$, $Y_j$, $Z_j$, and the density operator representing the state of the total system is ρ. (Hereinafter, this error is called "depolarizing error") The depolarizing model is the error model most frequently used and has a merit that its analysis is very simple. Furthermore, quantum error-correction effective for the depolarizing model is considered to be effective for another error model (For example, refer to C. M. Dawson, H. L. Hasegrove, and M. A. Nielsen, Phys. Rev. A73, 052306 (2006)). Accordingly, in the present invention, the depolarizing model is assumed.

2. Error of initialization of a qubit is modeled so that the qubit is initialized as the state orthogonal to the correct state with an error probability $P_p$.

3. Error of measurement of a qubit is modeled so that the measurement result is the state orthogonal to the correct state with an error probability $P_m$.

4. Among fundamental errors, the error of two-qubit gates is a principal error, and the probabilities of the other errors are small. That is, the probabilities of the other errors (memory error, error of one-qubit gate, error of initialization of qubit, error of measurement of qubit) are small in comparison with the following (4).

$$P_F P_{Fe} + (1-P_F)P_{Se} \quad (4)$$

5. The memory error and the error of one-qubit gate are ignored.

In order to simplify the examination, these error probabilities are ignored as they are sufficiently small. However, they can be considered by slightly increasing error probabilities of operations before and after them.

<Fault Tolerant Quantum Computing Method in Quantum Computing Method of the Present Invention>

Next, the fault tolerant quantum computing method of the present invention is explained. In the following explanation, next two matters are assumed.

1. A quantum error-correcting code is a concatenated code. Here, as to the concatenated code, first, by encoding a plurality of quantum bits (each called a physical qubit) represented by atomic energy levels, a qubit (it is called an encoded qubit of level 1) is composed. Furthermore, by encoding a plurality of encoded qubits of level 1, an encoded qubit of level 2 is composed. In this way, a larger encoded qubit is composed. A gate for the physical qubit is called "physical gate", and a gate for the encoded qubit is called "encoded gate". The level 0 indicates the physical qubit and the physical gate. And, because encoded qubits of the highest level are used for computation, it is called "logical qubit" by distinguishing from the other encoded qubits. A gate for a logical qubit is called "logical gate".

2. As to the quantum error-correcting (or detecting) code to be used, a Pauli gate (a gate to execute a Pauli operator X, Y or Z is called "Pauli gate", in which each gate corresponding to X, Y and Z is called "X gate, Y gate and Z gate"), a controlled-NOT gate, and a Hadamard gate, are executed transversally (many codes researched so far satisfy this). Here, "gates are executed transversally" means, if m-encoded qubits are composed by encoding n-physical qubits, when a physical gate G or I (identity operator) is independently performed to each of n-physical qubits, an encoded gate G is performed to each of m-encoded qubits (m, n: positive integral number). For example, when three qubits are encoded to one qubit, such a transversal CNOT gate is shown in FIG. 1. The Hadamard gate is defined as the following (5).

$$|0\rangle \to |+\rangle \equiv \frac{|0\rangle + |1\rangle}{\sqrt{2}},\ |1\rangle \to |-\rangle \equiv \frac{|0\rangle - |1\rangle}{\sqrt{2}} \quad (5)$$

Next, a method for executing arbitrary quantum computing to logical qubits (encoded qubits) is explained. Pauli gates, a CNOT gate, a Hadamard gate, a phase gate defined by the following (6), and combination thereof, are called Clifford gates.

$$|0\rangle \to |0\rangle,\ |1\rangle \to i|1\rangle \quad (6)$$

Universal quantum computing cannot be executed by the Clifford gates only. In addition to this, it is known that the preparation of some state (For example, the following state (7)) is sufficient (such a state is called a magic state).

$$|H\rangle \equiv \cos\frac{\pi}{8}|0\rangle + \sin\frac{\pi}{8}|1\rangle \quad (7)$$

By using |H> and CNOT gates, the π/8 gate as a non-Clifford gate (the following (8)) can be executed. By this gate and the Clifford gates, universal quantum computing can be executed.

$$|0\rangle \to |0\rangle,\ |1\rangle \to e^{i\pi/4}|1\rangle \quad (8)$$

Furthermore, by executing π/8 gate two times, a phase gate can be executed. Accordingly, in order to execute arbitrary quantum computing to a logical qubit, it is a sufficient condition that the Pauli gates, the CNOT gate and the Hadamard gate can be executed to the logical qubit, and above-mentioned |H> can be prepared for the logical qubit. As to the logical qubit, the Pauli gates, the CNOT gate and the Hadamard gate can be executed transversally. Furthermore, preparation of $|H\rangle_L$ (subscript L represents logical qubit) is performed by "decoding" as follows (For example, refer to E. Knill, Nature 434, 39 (2005)). First, a Bell state of logical qubits by the Clifford gates (phase gate is unnecessary) is prepared as the following (9). This first qubit is decoded to a physical qubit by the Clifford gates (phase gate is unnecessary) as the following (10). A one-qubit gate acts on the first qubit as the following (11). This first qubit is measured. When |0> is acquired by this measurement, a second qubit is $|H>_L$.

$$|B\rangle_L \equiv |0\rangle_L|0\rangle_L + |1\rangle_L|1\rangle_L \quad (9)$$

$$|0\rangle_L|0\rangle_L + |1\rangle_L|1\rangle_L \rightarrow |0\rangle|0\rangle_L + |1\rangle|1\rangle_L \quad (10)$$

$$|0\rangle|0\rangle_L + |1\rangle|1\rangle_L \rightarrow \left(\cos\frac{\pi}{8}|0\rangle + \sin\frac{\pi}{8}|1\rangle\right)|0\rangle_L + \left(\sin\frac{\pi}{8}|0\rangle - \cos\frac{\pi}{8}|1\rangle\right)|1\rangle_L = |0\rangle\left(\cos\frac{\pi}{8}|0\rangle_L + \sin\frac{\pi}{8}|1\rangle_L\right) + |1\rangle\left(\sin\frac{\pi}{8}|0\rangle_L - \cos\frac{\pi}{8}|1\rangle_L\right) \quad (11)$$

As mentioned-above, the method for executing universal quantum computing to logical qubits was explained. Next, as to the threshold, sufficiency of the Clifford gates (phase gate is unnecessary) is explained. Assume that the Clifford gates for the logical qubit are executed with sufficient high reliability by error-correction. If an ideal magic state $|H>_L$ is prepared, universal quantum computing having high reliability is possible with logical Clifford gates having high reliability. However, as mentioned-above, if $|H>_L$ is prepared by decoding, errors are added by encoded gates or physical gates (not logical gates), $|H>_L$ is not an ideal magic state. A plurality of erroneous $|H>_L$ are prepared, and $|H>_L$ having few error may be extracted from the plurality of $|H>_L$. This method is called "magic state distillation" (For example, refer to B. W. Reichardt, e-print ArXiv:quant-ph/0612004). When magic state distillation is utilized, if error probability of initial $|H>_L$ is small, a nearly ideal magic state can be created using only logical Clifford gates. A condition of error probability of $|H>_L$ is not hard (below several 10%), and therefore this condition hardly has influence on the threshold. Accordingly, the condition of the threshold is equivalent to a condition to realize the Clifford gates having high reliability. Especially, error probability of the CNOT gate is larger than those of the Pauli gates and the Hadamard gate. Accordingly, the condition of the threshold is also equivalent to a condition to realize the CNOT gate having high reliability (As explained afterwards, in the case of estimating the threshold by simulation, the error probability of a logical CNOT gate is calculated).

Next, quantum error-correction method of the present invention is explained. In order for this method to be suitable for two-qubit gates having failure information, this method is based on a quantum error-correction method "error-correcting teleportation" proposed by Knill (For example, refer to E. Knill, Phys. Rev. A71, 042322 (2005)). First, error-correcting teleportation is briefly explained (Refer to FIG. 2). Simply speaking, the error-correcting teleportation is a quantum teleportation using logical qubits.

Figure 2:
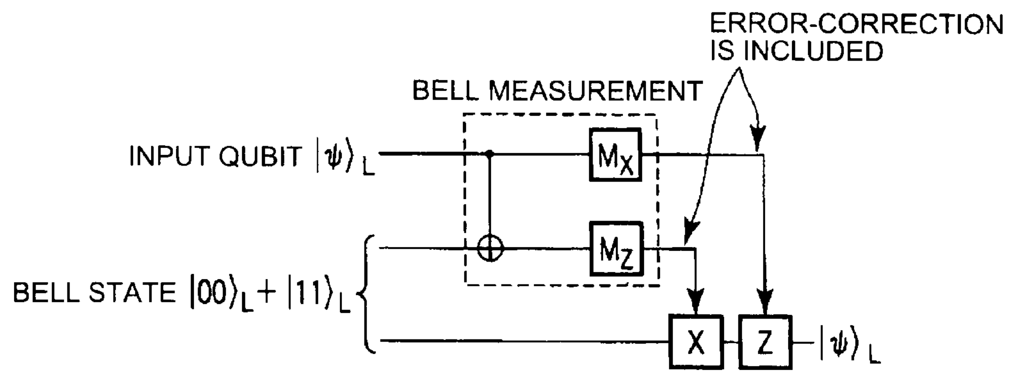
FIG. 2 is a schematic diagram to explain error-correcting teleportation.

First, by using logical qubits (encoded qubits of the highest level), a Bell state $|B>_L=(|00>_L+|11>_L)$ is prepared (subscript L represents logical qubit). Bell measurement is performed to this first qubit and an input qubit (logical qubit) as an object of error correction. In Bell measurement, qubit measurement is executed after a CNOT gate (This gate operation and qubit measurement are performed to the logical qubits. The logical CNOT gate is executed by transversal physical CNOT gates. Measurements of logical qubits can be performed by measurement of physical qubits.). The bases of qubit measurements are {|+>, |−>} for the control qubit of the CNOT gate, and {|0>, |1>} for the target qubit of the CNOT gate. (These measurements are respectively the same as measurement of eigenvalue of two Pauli operators X and Z (eigenvalue 1 corresponds to qubit 0, eigenvalue −1 corresponds to qubit 1), each of which is called X measurement and Z measurement. In FIG. 2, measurement is represented as $M_X$ and $M_Z$ in correspondence with X measurement and Z measurement. X measurement is the same as Z measurement after a Hadamard gate.).

In correspondence with measurement result, the second qubit of the Bell state becomes the state which is obtained by performing any of I, X, Y or Z on the input state (If the result of X measurement and Z measurement is (0,0), the operator is I. If the result is (0,1), the operator is X. If the result is (1,0), the operator is Z. If the result is (1,1), the operator is Y.). If an inverse operation of the operator is performed based on the measurement result, the second qubit of the Bell state becomes the input state. This is called quantum teleportation In above-mentioned processing, a principal error occurred at the second qubit of the Bell state (the output of the teleportation) is caused by wrong choice of the logical Pauli gate to be performed, based on the result of the ell measurement (In executing the logical Pauli gate, a Pauli gates is executed to each physical qubit transversally. Its error probability is low and it does not lead to a problem. Furthermore, if the following operation is a Clifford gate, this operation result can be combined with the logical Pauli gate of next teleportation without any operation. Briefly, the logical Pauli gate does not need to be executed until next non-Clifford gate is operated. For example, refer to E. Knill, Phys. Rev. A71, 042322 (2005)). Here, since the input state and the Bell state are encoded states, by performing error-correction to the measurement result of the physical qubits, the result of the Bell measurement to the logical qubit can be acquired with high accuracy. As a result, the error probability of the output can be lowered. This is Knill's error-correcting teleportation.

By executing a logical Pauli gate and a logical Hadamard gate transversally, they can be executed with low error probability. In the case of performing error-correction to the errors, above-mentioned teleportation is performed on the logical qubit on which the gate is performed. The logical CNOT gate can be executed transversally (As Knill has operated as described in Nature 434, 39 (2005)). However, in the present invention, the logical CNOT gate is executed by teleportation using four qubit state $|\chi>$ acquired shown in FIG. 3. (When the CNOT gate is executed to two qubits (a control qubit and a target qubit), two teleportation operations (Bell measurement of a first qubit of $|\chi>$ and the control qubit, Bell measurement of a fourth qubit of $|\chi>$ and the target qubit) are performed. As a result, a second qubit of $|\chi>$ is the target qubit after CNOT gate, and a third qubit of $|\chi>$ is the control qubit after CNOT gate. Refer to FIG. 4 and D. Gottesman and I. L. Chuang, Nature 402, 390 (1999)). As mentioned-above, gate operations necessary for universal quantum computing are the above operations only. In the case of performing these operations, the physical CNOT gate is necessary only for a Bell measurement. Just before the measurement of the physical qubit, the physical CNOT gate is operated to each physical qubit only one time. This is important for the error-correction suitable for two-qubit gates having failure information (As explained hereinafter). (In the case of preparing of $|\chi>$, by postselection to adopt only a state having no error using error-detection, errors of $|\chi>$ can be lowered. This is the reason why encoded CNOT gates are executed by teleportation.)

Hereinafter, error-correcting teleportation in the method of the present invention is explained in detail. In order to explain concretely, first, error-correction method in the case of using Steane code (well-known as one-error-correcting code) is explained. After that, error-correction method in the case of using N-error-correcting code (N: integral number equal to or larger than 1) as more general one, and error-correcting method in the case of using a concatenated code (Hereinafter, Knill code) using error-detecting codes proposed by Knill, are explained.

First, the Steane code is explained the Steane code is defined as the following (12).

$$|0\rangle_{L_{l+1}} \equiv |0000000\rangle_{L_l} + |1010101\rangle_{L_l} + |0110011\rangle_{L_l} + |1100110\rangle_{L_l} + |0001111\rangle_{L_l} + |1011010\rangle_{L_l} + |0111100\rangle_{L_l} + |1101001\rangle_{L_l}, \quad (12)$$

$$|1\rangle_{L_{l+1}} \equiv |1111111\rangle_{L_l} + |0101010\rangle_{L_l} + |1001100\rangle_{L_l} + |0011001\rangle_{L_l} + |1110000\rangle_{L_l} + |0100101\rangle_{L_l} + |1000011\rangle_{L_l} + |0010110\rangle_{L_l}$$

Here, subscript $L_1$ represents encoded qubit of level 1 (l: integral number equal to or larger than 1). Level 0 represents a physical qubit. The Steane code can execute Clifford gates (Pauli gates, CNOT gate, Hadamard gate, phase gate) transversally. Encoded |0> and |1> of the Steane code comprises sixteen states each having seven bits. The reason for this is that a classical code (effective code well known as Hamming code) to encode seven bits into four bits (having sixteen patterns) is used. This classical code is called "(7,4) Hamming code". The Hamming code is one of the classical codes called "linear code." By regarding the bit sequence of the code as a vector and by multiplying a check matrix to the bit sequence, an error included in the encoded bit is detected, and corrected. In the case of (7,4) Hamming code, a check matrix H is represented as the following (13).

$$H = \begin{pmatrix} 1 & 0 & 1 & 0 & 1 & 0 & 1 \\ 0 & 1 & 1 & 0 & 0 & 1 & 1 \\ 0 & 0 & 0 & 1 & 1 & 1 & 1 \end{pmatrix} \quad (13)$$

When one of encoded four bits of (7,4) Hamming code is vector-noted as the following (14), a vector (the following (15)) is acquired by multiplying the check matrix with (14). This vector (15) is called "syndrome", and an error position is known by the syndrome. (A sum of matrix elements of the right-hand side is calculated mod 2, which is a remainder in dividing the sum by 2. Hereinafter, as to the sum, "=" is often used meaning congruence expression of mod 2.)

$$\vec{x}^T = (x_1 \;\; x_2 \;\; x_3 \;\; x_4 \;\; x_5 \;\; x_6 \;\; x_7) \quad (14)$$

$$\vec{s} \equiv \begin{pmatrix} s_1 \\ s_2 \\ s_3 \end{pmatrix} \equiv H\vec{x} = \begin{pmatrix} x_1 + x_3 + x_5 + x_7 \\ x_2 + x_3 + x_6 + x_7 \\ x_4 + x_5 + x_6 + x_7 \end{pmatrix} \quad (15)$$

The binary number (the following (16)) of which figure is three elements of the syndrome has eight values "0~7". This binary number is also called "syndrome". If the number of errors (bit-flip errors) is zero or one, "s=0" represents that no error exists, and "s>0" represents that $x_s$ has an error. In this way, a one-bit error can be corrected. Accordingly, (7,4) Hamming code is one-error-correcting code.

$$s \equiv 2^2 s_3 + 2 s_2 + s_1 \quad (16)$$

In the same way, as to the Steane code, one bit-flip error can be corrected. For example, when seven physical qubits composing an encoded qubit of level 1 are measured, if a measurement result of the seven qubits does not include a bit-flip error, the measurement result is one of sixteen patterns of (7,4) Hamming code. If the number of the bit-flip errors is zero or one, by multiplying a check matrix of (7,4) Hamming code with the measurement result and by acquiring a syndrome, an error position is known and corrected. As a result, the measurement result of an encoded qubit of level 1 can be known with high accuracy. (Here, in order to raise the accuracy by correcting one qubit, assumption that probability which at least two qubits are erroneous is sufficiently low is necessary. Accordingly, if the error probability of each qubit is $p_e$, the probability that k qubits are erroneous is always set as order of $p_e^k$. Computing by satisfying this condition is a condition of fault tolerant calculation. Transversal gate operation automatically satisfies this condition.) As to the classical code, four bits are represented by seven bits. On the other hand, as to a quantum bit (qubit), by creating eight superposed states per one qubit, only one qubit is represented by seven qubits. The reason for this is that not only bit-flip errors (classical errors are only them) but also phase-flip errors are desired to be corrected. Correction of the phase-flip errors is possible as follows. First, the basis of the Steane code is converted to {|+>, |->} by an encoded Hadamard gate (|±>=|0>±|1>). As to the Steane code, the encoded Hadamard gate can be execured transversally. Accordingly, the encoded {|+>, |->} is the following (17).

$$|+\rangle_{L_{l+1}} \equiv |{+}{+}{+}{+}{+}{+}{+}\rangle_{L_l} + |{-}{+}{-}{+}{-}{+}{-}\rangle_{L_l} + |{+}{-}{-}{+}{+}{-}{-}\rangle_{L_l} + |{-}{-}{+}{+}{-}{-}{+}\rangle_{L_l} + |{+}{+}{+}{-}{-}{-}{-}\rangle_{L_l} + |{-}{+}{-}{-}{+}{-}{+}\rangle_{L_l} + |{+}{-}{-}{-}{-}{+}{+}\rangle_{L_l} + |{-}{-}{+}{-}{+}{+}{-}\rangle_{L_l}, \quad (17)$$

$$|-\rangle_{L_{l+1}} \equiv |{-}{-}{-}{-}{-}{-}{-}\rangle_{L_l} + |{+}{-}{+}{-}{+}{-}{+}\rangle_{L_l} + |{-}{+}{+}{-}{-}{+}{+}\rangle_{L_l} + |{+}{+}{-}{-}{+}{+}{-}\rangle_{L_l} + |{-}{-}{-}{+}{+}{+}{+}\rangle_{L_l} + |{+}{-}{+}{+}{-}{+}{-}\rangle_{L_l} + |{-}{+}{+}{+}{+}{-}{-}\rangle_{L_l} + |{+}{+}{-}{+}{-}{-}{+}\rangle_{L_l}$$

A phase-flip reverses "+" and "−". If "+" and "−" are respectively corresponded to "0" and "1", the phase-flip is equivalent to a bit-flip, and can be corrected by the Hamming code in the same way as bit-flip error. In error-correcting teleportation, the basis of the measurement is {|0>, |1>} or {|+>, |->}, and it is sufficient that only bit-flip and phase-flip can be corrected. If the error is an eraser error (error position is previously known), the Steane code can correct two errors. (In general, an N-error-correcting code can correct 2N eraser errors. For example, refer to M. Grass 1, T. Pellizzari, Phys . Rev. A56, 33 (1997)). This method is explained. As understood from above explanation of error-correction, it is sufficient to prove that (7,4) Hamming code can correct two qubit-flip eraser error.

When two eraser errors are included (error positions are $j_1$ and $j_2$), as to the syndrome s (acquired as above-mentioned), "s=0" represents no error, "s=$j_1$" represents that only $j_1$ has error, and "s=$j_2$" represents that only $j_2$ has error. Furthermore, noting $j_1$ and $j_2$ as the binary number, each figure is added mod 2, and the number each figure of which as the binary number is the above calculation result is set to J. Here, "s=J" represents that both $j_1$ and $j_2$ have errors. In this way, the (7,4) Hamming code can correct two bit-flip eraser errors, and the Steane code can correct two eraser errors.

In the case of using the Steane code, error-correcting teleportation of the present invention is executed as follows. A main processing to be executed at the teleportation is Bell measurement for two logical qubits. At the Bell measurement, in order to determine (estimate) the value of the logical qubit from the measurement result (classical information represented by classical bit “0” or “1”) of physical qubits, the method of the present invention is executed as follows. First, as to each encoded qubit of level 1, a measured value of each encoded qubit of level 1 is determined from the measurement result of physical qubits. Assume that the measurement result of seven physical qubits composing encoded qubit of some level 1 is the following (18) (In the same way as the above-mentioned (7,4) Hamming code).

$$\vec{x}^T = (x_1\, x_2\, x_3\, x_4\, x_5\, x_6\, x_7) \tag{18}$$

In the case of no error, this measurement result is equal to one of sixteen patterns of the (7,4) Hamming code. Since a physical CNOT gate of the present invention has failure information, the measurement result of each physical qubit has also failure information. (If failure information of some physical CNOT gate is F(S), failure information of measurement result of two physical qubits operated by the physical CNOT gate is defined as F(S).) Based on this failure information, the measured value of an encoded qubit of level 1 is determined from the measurement result of the physical qubit as follows.

1. If all of the seven physical qubits have failure information S, the measured value of the encoded qubit of level 1 is determined by one-error-correction (above-mentioned error-correction method), and failure information of the encoded qubit of level 1 is defined as S.

2. If one of the seven physical qubits has failure information F (its position is j), the measured value of the encoded qubit of level 1 is determined by one-error-correction (by ignoring the failure information), and failure information of the encoded qubit of level 1 is defined as S.

3. If two of seven physical qubits have failure information F (their positions are $j_1$ and $j_2$), 3-1. If the syndrome s is equal to any of 0, $j_1$, $j_2$ or J (As mentioned-above, J is defined from $j_1$ and $j_2$), the measured value of the encoded qubit of level 1 is determined by the above-mentioned erasure-error-correction method, and failure information of the encoded qubit of level 1 is defined as S.

3-2. If the syndrome s is not equal to each of 0, $j_1$, $j_2$ and J, a measured value of an encoded qubit of level 1 is determined by one error-correction method (by ignoring the failure information), and failure information of the encoded qubit of level 1 is defined as F.

4. If at least three of the seven physical qubits have failure information F, the measured value of the encoded qubit of level 1 is determined by one-error-correction (by ignoring the failure information), and failure information of the encoded qubit of level 1 is defined as F.

(Above-mentioned cases “1~4” are, if only the error probability of physical CNOT gates is considered, based on a probability that the measured value of the encoded qubit of level 1 determined by error-correction is correct, and sorted in higher order of the probability. Thus, failure information of cases “1”, “2” and “3-1” where the probability is relatively high is defined as S, and failure information of cases “3-2” and “4” where the probability is low is defined as F) In this way, the measured value of each encoded qubit of level 1 is determined, and, at the same time, failure information of the encoded qubit of level 1 is defined. Next, by using the measured value of the encoded qubit of level 1, the measured value of an encoded qubit of level 2 is determined in the same way as above-mentioned processing method. By repeating this processing to the highest level, the measured value of a logical qubit (encoded qubit of the highest level) is determined.

By extending the above-mentioned method, error-correction method in the case of using a general N-error-correcting code is defined as follows. (As to level 0 (l=0), “encoded qubit” is replaced with “physical qubit”, and “encoded CNOT gate” is replaced with “physical CNOT gate”.)

1. If all of the encoded qubits of level l composing an encoded qubit of level (l+1) have failure information S, the measured value of the encoded qubit of level (l+1) is determined by N-error-correction, and failure information of the encoded qubit of level (l+1) is defined as S.

2. If the number of the encoded qubits of level l with failure information F composing an encoded qubit of level (l+1) is 1~N, the measured value of the encoded qubit of level (l+1) is determined by N-error-correction (ignoring the failure information), and failure information of the encoded qubit of level (l+1) is defined as S.

3. If the number of encoded qubits of level l with failure information F composing an encoded qubit of level (l+1) is (N+1)~2N, 3-1. If the syndrome as a 2N-erasure-error-correcting code represents no error or that only the qubits having failure information F have errors, the measured value of the encoded qubit of level (l+1) is determined by correcting the errors (If no error, correction is unnecessary), and failure information of the encoded qubit of level (l+1) is defined as S.

3-2. If the syndrome as a 2N-erasure-error-correcting code represents errors and that a qubit having failure information S has an error, the measured value of the encoded qubit of level (l+1) is determined by N-error-correction (ignoring the failure information), and failure information of the encoded qubit of level (l+1) is defined as F.

4. If the number of encoded qubits of level l with failure information F composing an encoded qubit of level (l+1) is equal to or larger than (2N+1), the measured value of the encoded qubit of level (l+1) is determined by N-error-correction (ignoring the failure information), and failure information of the encoded qubit of level (l+1) is defined as F.

As a concrete example of the error-correcting code, for example, Golay code to correct three errors [23, 1, 7] is usable (For example, refer to A. M. Steane, Phys, Rev. A68, 042322 (2003)).

Next, the Knill code is explained in detail. The Knill code is defined as the following (19) and (20).

$$\begin{aligned}
|00\rangle_{L_1} &\equiv |0000\rangle_{L_0} + |1111\rangle_{L_0},\\
|01\rangle_{L_1} &\equiv |0101\rangle_{L_0} + |1010\rangle_{L_0},\\
|10\rangle_{L_1} &\equiv |0011\rangle_{L_0} + |1100\rangle_{L_0},\\
|11\rangle_{L_1} &\equiv |0110\rangle_{L_0} + |1001\rangle_{L_0},
\end{aligned} \tag{19}$$

As to higher levels than 1 (l≧1), $$\begin{aligned}
|00\rangle_{L_{l+1}} \equiv\ & |00\rangle_{L_l}|00\rangle_{L_l}|00\rangle_{L_l} + |01\rangle_{L_l}|11\rangle_{L_l}|10\rangle_{L_l} + \\
& |10\rangle_{L_l}|01\rangle_{L_l}|11\rangle_{L_l} + |11\rangle_{L_l}|10\rangle_{L_l}|01\rangle_{L_l},\\
|01\rangle_{L_{l+1}} \equiv\ & |10\rangle_{L_l}|11\rangle_{L_l}|00\rangle_{L_l} + |11\rangle_{L_l}|00\rangle_{L_l}|10\rangle_{L_l} + \\
& |00\rangle_{L_l}|10\rangle_{L_l}|11\rangle_{L_l} + |01\rangle_{L_l}|01\rangle_{L_l}|01\rangle_{L_l},\\
|10\rangle_{L_{l+1}} \equiv\ & |01\rangle_{L_l}|10\rangle_{L_l}|00\rangle_{L_l} + |00\rangle_{L_l}|01\rangle_{L_l}|10\rangle_{L_l} + \\
& |11\rangle_{L_l}|11\rangle_{L_l}|11\rangle_{L_l} + |10\rangle_{L_l}|00\rangle_{L_l}|01\rangle_{L_l},\\
|11\rangle_{L_{l+1}} \equiv\ & |11\rangle_{L_l}|01\rangle_{L_l}|00\rangle_{L_l} + |10\rangle_{L_l}|10\rangle_{L_l}|10\rangle_{L_l} + \\
& |01\rangle_{L_l}|00\rangle_{L_l}|11\rangle_{L_l} + |00\rangle_{L_l}|11\rangle_{L_l}|01\rangle_{L_l},
\end{aligned} \tag{20}$$

As to level 1, four qubits are encoded into a qubit pair (two qubits), and an error of one qubit in the four qubits can be detected (If an erasure error, it can be corrected). As to higher levels than 1, three qubit pairs are encoded into one qubit pair, and an error in one qubit pair can be detected (If an erasure error, it can be corrected). As to the Knill code, Pauli gates, CNOT gate and Hadamard gate can be executed transversally. (Two encoded qubits always forms a pair. An encoded gate respectively executes the same gate to two qubits of the pair. Accordingly, the encoded gate is always executed as a gate pair. In order to simplify, however, this is called not "encoded qubit pair" but "encoded gate".) The Knill code is based on classical linear codes. A check matrix for level 1 is represented as the following (21), and a check matrix for higher levels than 1 is represented as the following (22).

$$H_1 = (1\ \ 1\ \ 1\ \ 1) \tag{21}$$

$$H_2 = \begin{pmatrix} 1 & 0 & 0 & 1 & 1 & 1 \\ 1 & 1 & 1 & 0 & 0 & 1 \end{pmatrix} \tag{22}$$

The error-correction and the erasure-error-correction of level 1 are executed as follows. The measurement result of an encoded qubit pair of level 1 comprises measurement results of four physical qubits. These measurement results are represented as the following (23), and the syndrome thereof is represented as the following (24) (the sum is the mod-2 sum).

$$\vec{x}^T = (x_1\, x_2\, x_3\, x_4) \tag{23}$$

$$s \equiv H_1 \vec{x} = x_1 + x_2 + x_3 + x_4 \tag{24}$$

If the number of the qubit errors is equal to zero or one, the syndrome "s=0" represents no error, and the syndrome "s=1" represents one qubit-error, i.e., the error can be detected. In the case of the erasure error, it is previously known which qubit has an error. For example, assume that this qubit is $x_1$. The error can be corrected as the following (25) so that the syndrome is equal to 0 (the sum is the mod-2 sum.)

$$x_1 = x_2 + x_3 + x_4 \tag{25}$$

The error-correction and the erasure error-correction of level 2 are executed as follows. The measurement result of an encoded qubit pair of level 2 comprises measurement results of three encoded qubit pairs of level 1. These measurement results are represented as the following (26), and the syndrome thereof is represented as the following (27).

$$\vec{x}^T = (x_1\ \ x_2\ \ x_3\ \ x_4\ \ x_5\ \ x_6) \tag{26}$$

$$\vec{s} \equiv \begin{pmatrix} s_1 \\ s_2 \end{pmatrix} \equiv H_2 \vec{x} = \begin{pmatrix} x_1 + x_4 + x_5 + x_6 \\ x_1 + x_2 + x_3 + x_6 \end{pmatrix} \tag{27}$$

If the number of the qubit-pair errors is equal to zero or one, the syndrome "$(s_1,s_2)=(0,0)$" represents no error, and the syndrome "$(s_1,s_2)\neq(0,0)$" represents one qubit-pair error, i.e., the error can be detected. In the case of the erasure error, it is previously known which qubit pair has an error. For example, assume that these qubits are $x_1$ and $x_2$. These errors can be corrected as the following (28) and (29) so that the syndrome is equal to 0 (the sum is the mod-2 sum.)

$$x_1 = x_4 + x_5 + x_6 \tag{28}$$

$$x_2 = x_1 + x_3 + x_6 = (x_4 + x_5 + x_6) + x_3 + x_6 = x_3 + x_4 + x_5 \tag{29}$$

As to the error-correcting teleportation of the present invention in the case of using the Knill code, the error-correction method for a Bell measurement result is explained. First, at level 1, the following processing is performed.

1. If all of four physical qubits have failure information S, error-detection is performed by above-mentioned error-detection method. If an error is not detected, the measured value of an encoded qubit pair of level 1 is determined, and failure information of the encoded qubit pair of level 1 is defined as S. If the error is detected, failure information of the encoded qubit pair is defined as F. (If the error is detected, the measured value of the encoded qubit pair of level 1 cannot be determined. However, because the failure information is F, the measured value is unnecessary, and that is not a problem.)

2. If the number of four physical qubits with failure information F is one, one physical qubit having the failure information F is regarded as an erasure error. The erasure error of the one physical qubit is corrected by above-mentioned method, the measured value of the encoded qubit pair of level 1 is determined, and failure information of the encoded qubit pair of level 1 is defined as S.

3. If the number of four physical qubits with failure information F is at least two, failure information of an encoded qubit pair of level 1 is defined as F. (The measured value of the encoded qubit pair of level 1 cannot be determined. However, because the failure information is F, the measured value is unnecessary, and that is not a problem.)

In this way, the measurement result of each encoded qubit pair of level 1 is determined, and, at the same time, failure information of the encoded qubit pair of level 1 is defined. As to higher levels than 1 ($l \geqq 1$), the following processing is performed.

1. If all of the three encoded qubit pairs of level l composing an encoded qubit pair of level (l+1) has failure information S, error detection is performed. If an error is not detected, the measured value of the encoded qubit pair of level (l+1) is determined, and failure information of the encoded qubit pair of level (l+1) is defined as S. If the error is detected, the failure information of the encoded qubit pair of level (l+1) is defined as F.

2. If the number of the three encoded qubit pairs of level l with failure information F composing an encoded qubit pair of level (l+1) is one, one physical qubit having the failure information F is regarded as an erasure error. The erasure error of the one physical qubit is corrected by above-mentioned method. The measured value of the encoded qubit pair of level (l+1) is determined, and failure information of the encoded qubit pair of level (l+1) is defined as S.

3. If the number of the three encoded qubit pairs of level l with failure information F composing an encoded qubit pair of level (l+1) is at least two, failure information of the encoded qubit pair of level (l+1) is defined as F.

In this way, the measurement result of each encoded qubit pair of level (l+1) is determined, and, at the same time, failure information of the encoded qubit pair of level (l+1) is defined. By repeating this processing to the highest level, the measured value of a logical qubit pair (encoded qubit pair of the highest level) is determined.

<Error of State Preparation>

The error-correcting teleportation method, which is only a single processing in fault-tolerant quantum computing, is explained. This error-correcting teleportation method is an essential part of the present invention. However, this is not sufficient to calculate the threshold, and errors occurred in preparing entangled states (Bell state or $|\chi\rangle$) used for encoded qubits and teleportation should be taken into consideration. The errors in state preparation must be suppressed as small as possible, and the state-preparation method should be taken care. Furthermore, above-mentioned fault-tolerant condition (If error probability of each bit is $p_e$, probability which k bits are erroneous should be always order of $p_e^k$.) shoud be satisfied. Hereinafter, this state-preparation method is explained.

Encoding method is different for each code. (As to Steane code, for example, Reichardt, e-print arXiv: quant-ph/0612004. As to the Knill code, for example, refer to E. Knill, Nature 434, 39 (2005). In the encoding method of the present invention, these conventional methods are used except for aspects explained below. These encoding methods satisfy the fault tolerant condition.)

In order of lower level, a state of level (l+1) is prepared using a state of level l. At state preparation of level (l+1), an encoded CNOT gate of level l is used. At state preparation of level l, postselection that the above processing is repeated until all failure information of the physical CNOT gate used becomes S is performed. At state preparation of level (l+1) (l: an integral number equal to or larger than one), encoded CNOT gates of level 1 are performed using |χ> and two teleportations (Refer to FIG. 4). In order to reduce errors, when at least one of logical qubits in Bell measurement results at the encoded CNOT gate has failure information F, postselection to repeat the processing from the beginning is performed.

Figure 3:
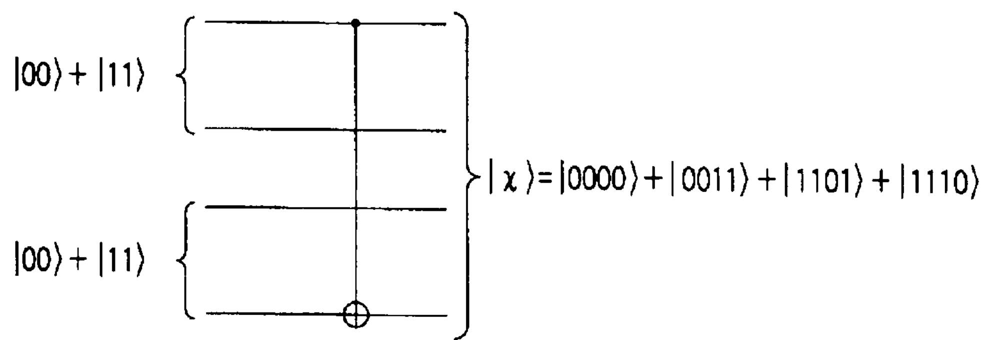
FIG. 3 is a quantum circuit to explain generation method of the four-qubit state $|\chi\rangle$ necessary for executing a CNOT gate by teleportation.
Figure 4:
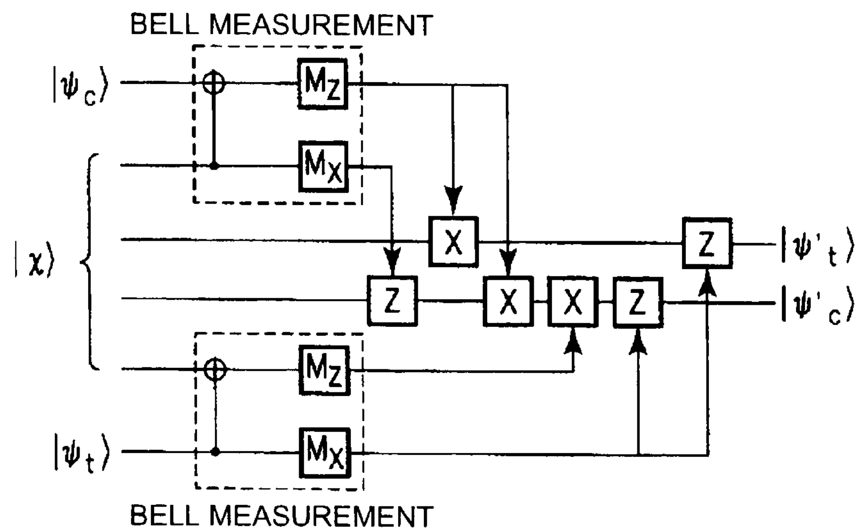
FIG. 4 is a quantum circuit to show that the second qubit of $|\chi\rangle$ is the target qubit and the third qubit of $|\chi\rangle$ is the control qubit after a CNOT gate.

Furthermore, at state preparation of |χ>, after the last encoded CNOT gate (CNOT gate in FIG. 3) is performed at the state preparation, "error-detecting teleportation" is performed to two encoded qubits executed (first and fourth qubits of |χ> in FIG. 3). Here, "error-detecting teleportation" is, in processing of Bell measurement result at error-correcting teleportation, not above-mentioned error-correction but error-detection is performed to encoded qubits of the highest level. At the error-detecting teleportation, if errors are not detected at all (Briefly, if all failure information of encoded qubits of one lower level than the highest level is S and if the syndrome of the highest level does not represent an error), postselection to adopt the state is performed.

In order to further lower the error of the state preparation, the condition of postselection is made strict. For example, definition of failure information of encoded CNOT gates used for the state preparation is changed as follows.

In the case of N-error-correcting code:

1. If all of encoded qubits of level l composing an encoded qubit of level (l+1) have failure information S, the measured value of the encoded qubit of level (l+1) is determined by N-error-correction, and failure information of the encoded qubit of level (l+1) is defined as S.

2. If the number of the encoded qubits of level l with failure information F composing an encoded qubit of level (l+1) is 1~N:

2-1. If the syndrome s is "0", nothing is performed. If the syndrome s is not "0" and if the error positions represented by the syndrome are the same as the error positions represented by the failure information, the measured value of the encoded qubit of level (l+1) is determined by N-error-correction (based on the syndrome), and failure information of the encoded qubit of level (l+1) is defined as S.

2-2. If the syndrome s is not "0" and if an error position represented by the syndrome is different from an error position represented by the failure information, a measured value of the encoded qubit of level (l+1) is determined by N-error-correction (ignoring the failure information), and failure information of the encoded qubit of level (l+1) is defined as F.

3. If the number of the encoded qubits of level l with failure information F composing an encoded qubit of level (l+1) is (N+1)~2N, the measured value of the encoded qubit of level (l+1) is determined by N-error-correction (ignoring the failure information), and failure information of the encoded qubit of level (l+1) is defined as F.

4. If the number of the encoded qubits of level l with failure information F composing an encoded qubit of level (l+1) is at least (2N+1), the measured value of the encoded qubit of level (l+1) is determined by N-error-correction (ignoring the failure information), and failure information of the encoded qubit of level (l+1) is defined as F.

In the case of the Knill code:

1. If all of four physical qubits of level 1 have failure information S, error-detection is performed. If an error is not detected, the measured value of the encoded qubit pair of level 1 is determined, and failure information of the encoded qubit pair of level 1 is defined as S. If the error is detected, failure information of the encoded qubit pair is defined as F.

2. If the number of the four physical qubits of level 1 with failure information F is one, one physical qubit having the failure information F is regarded as an erasure error. The erasure error of the one physical qubit is corrected by above-mentioned method, the measured value of an encoded qubit pair of level 1 is determined, and failure information of the encoded qubit pair of level 1 is defined as F.

3. If the number of the four physical qubits of level 1 with failure information F is at least two, failure information of the encoded qubit pair of level 1 is defined as F.

4. If all of the three encoded qubit pairs of level l (l: an integral number equal to or larger than "1") composing an encoded qubit pair of level (l+1) have failure information S, error-detection is performed. If an error is not detected, the measured value of the encoded qubit pair of level (l+1) is determined, and failure information of the encoded qubit pair of level (l+1) is defined as S. If the error is detected, failure information of the encoded qubit pair of level (l+1) is defined as F.

5. If the number of the three encoded qubit pairs of level l with failure information F composing an encoded qubit pair of level (l+1) is one, one qubit pair having the failure information F is regarded as an erasure error. The erasure error of the one qubit pair is corrected, the measured value of the encoded qubit pair of level (l+1) is determined, and failure information of the encoded qubit pair of level (l+1) is defined as F.

6. If the number of three encoded qubit pairs of level l with failure information F composing an encoded qubit pair of level (l+1) is at least two, failure information of the encoded qubit pair of level (l+1) is defined as F.

As mentioned-above, if the condition is more strict, the number of errors decreases. However, the number of repeat of processing increases, and resources of computing also increase. If the resources increase too much by setting above-mentioned strict condition to all levels, this strict condition is set to only several levels so that the resources do not increase too much. Briefly, the strict condition is optimized for the error and resource.

<Confirmation of Effect by Simulation>

In order to confirm effect of the error-correction method (explained above) of the present invention, simulations in the cases of the Steane code and the Knill code were performed. (As to the simulation method, refer to E. Knill, Nature 434, 39 (2005)) In these simulations, the error probability of a logical CNOT gate (using |χ> and two teleportations) is calculated, and a threshold of a fundamental error probability is estimated. (As mentioned-above, a threshold of the logical CNOT gate is regarded as a threshold of fault tolerant quantum computing.)

Assume that error of state preparation of two input qubits is the same as errors of two output qubits of |χ> (the second and third qubits in FIG. 4) to simulate the middle of a computation. (Because, at the halfway computing, an output of some CNOT gate is an input of the next CNOT gate. In order to simplify, errors between two CNOT gates are ignored.) As to fundamental errors and their probabilities, three probabilities (the following (31)) characterizing errors of the physical CNOT gate, an error probability (the following (32)) of initialization of the physical qubit, and an error probability (the following (33)) of measurement of the physical qubit, are taken into consideration.

$$p_F, p_{Fe}, p_{Se} \tag{31}$$

$$p_p \tag{32}$$

$$p_m \tag{33}$$

In above-mentioned error-correction method, failure information of the logical qubit at Bell measurement is defined. Accordingly, a failure probability of the logical CNOT gate (probability which at least one of four logical qubits to be Bell measured in the logical CNOT gate has failure information F) and a conditional error probability of the failure information can be considered in the same way as the physical CNOT gate. At the logical CNOT gate of level 1, assume that the failure probability is the following (34), the conditional error probability on the condition that the failure information is F is the following (35), and the error probability on the condition that the failure information is S is the following (36). Here, the error probability (the following (37)) of the logical CNOT gate is represented as the following (38).

$$p_F^{(l)} \tag{34}$$

$$p_{Fe}^{(l)} \tag{35}$$

$$p_{Se}^{(l)} \tag{36}$$

$$p_e^{(l)} \tag{37}$$

$$p_e^{(l)}=(1-p_F^{(l)})p_{Se}^{(l)}+p_F^{(l)}p_{Fe}^{(l)} \tag{38}$$

In this simulation, the state preparation uses postselection based on not above-mentioned strict condition but regular error-correction method.

Figure 5:
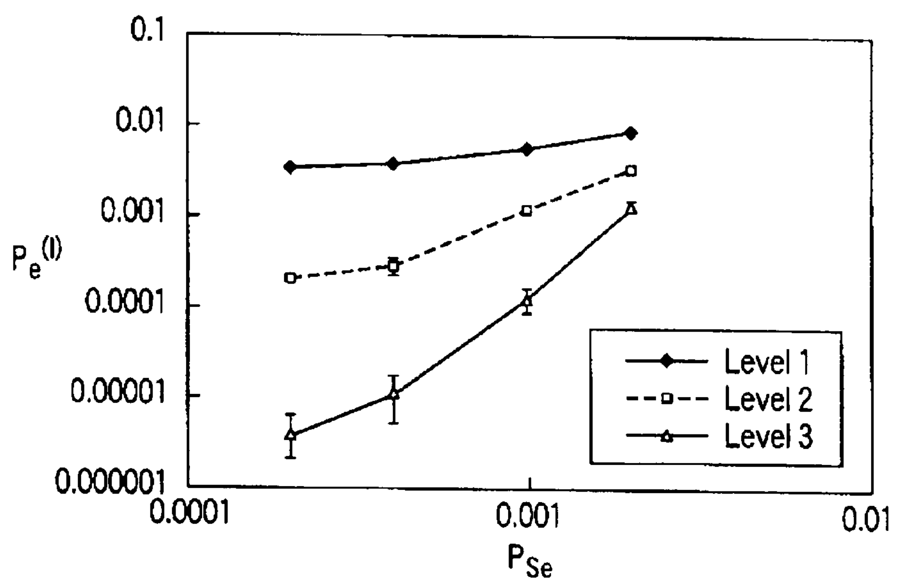
FIG. 5 is a simulation result (vertical axis and horizontal axis are on log scales) in the case of the Steane code.

First, the simulation result in the case of the Steane code is explained. The fundamental error probabilities except for the following value (39) are fixed as the following condition (40). While the following value (41) is changed, the following calculation result (42) is shown in FIG. 5. (An error bar is a standard error estimated from twenty eight simulations)

$$p_{Se} \tag{39}$$

$$p_F=0.04.\ p_{Fe}=1,\ p_p=10^{-4},\ p_m=10^{-4} \tag{40}$$

$$p_{Se} \tag{41}$$

$$p_e^{(l)} \tag{42}$$

As shown in FIG. 5, in the case of the following condition (43), when the level is higher, the following value (44) becomes smaller. Accordingly, from a view point of the following value (45), for example, in the case of the following condition (46), a threshold of the following value (47) is larger than 0.04.

$$p_{Se}<10^{-3} \tag{43}$$

$$p_e^{(l)} \tag{44}$$

$$p_F \tag{45}$$

$$p_{Se}=10^{-3},\ p_{Fe}=1,\ p_p=10^{-4},\ p_m=10^{-4} \tag{46}$$

$$p_F \tag{47}$$

On the other hand, as explained before, assume that the conventional quantum error-correction method is used by ignoring the failure information (not using the method of the present invention). Here, a condition of the threshold is "$P_F$ is smaller than a conventional threshold $10^{-2}$~$10^{-3}$". Accordingly, the simulation result which a threshold of the following value (48) is larger than 0.04 represents that effect of the present invention is large.

$$p_F \tag{48}$$

Figure 6:
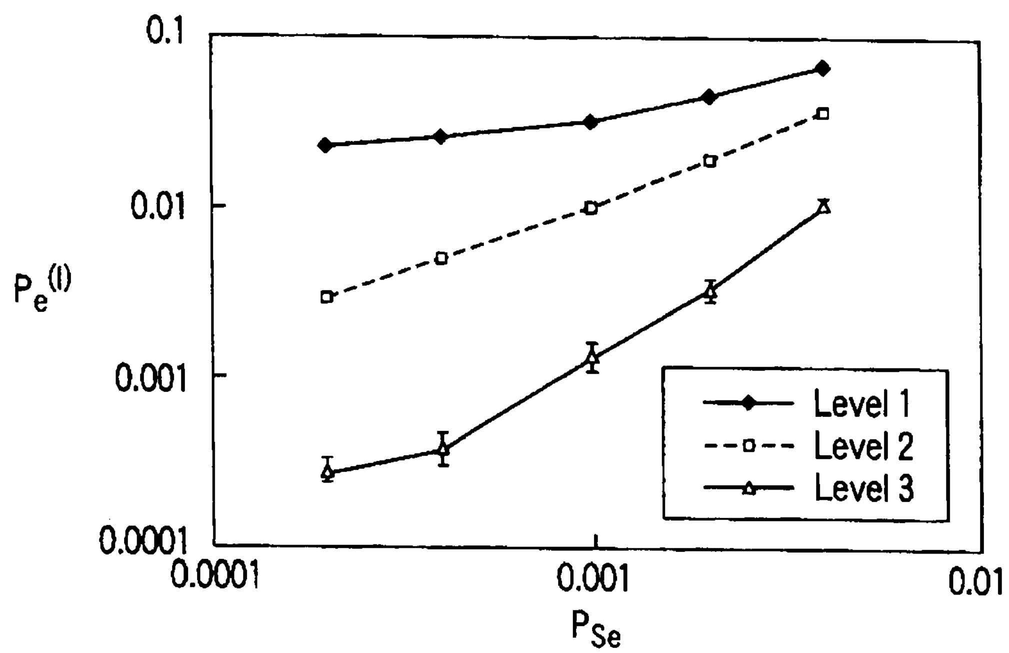
FIG. 6 is a simulation result (vertical axis and horizontal axis are on log scales) in the case of the Knill code.

Next, the simulation result in the case of the Knill code is explained. In the same way as the Steane code, the fundamental error probabilities except for the following value (49) are fixed as the following condition (50). While the following value (51) is changed, the following calculation result (52) is shown in FIG. 6. (An error bar is a standard error estimated from twenty eight times-simulations) As shown in FIG. 6, in case that the following value (53) is $4\times10^{-3}$, when the level is higher, the following value (54) becomes smaller. Accordingly, in the case of the following condition (55), a threshold of the following value (56) is larger than 0.04. In the same discussion as the case of the Steane code, this simulation result represents that effect of the present invention is large.

$$p_{Se} \tag{49}$$

$$p_F=0.04,\ p_{Fe}=1,\ p_p=10^{-4},\ p_m=10^{-4} \tag{50}$$

$$p_{Se} \tag{51}$$

$$p_e^{(l)} \tag{52}$$

$$p_{Se} \tag{53}$$

$$p_e^{(l)} \tag{54}$$

$$p_{Se}=4\times10^{-3},\ p_{Fe}=1,\ p_p=10^{-4},\ p_m=10^{-4} \tag{55}$$

$$p_F \tag{56}$$

Figure 7:
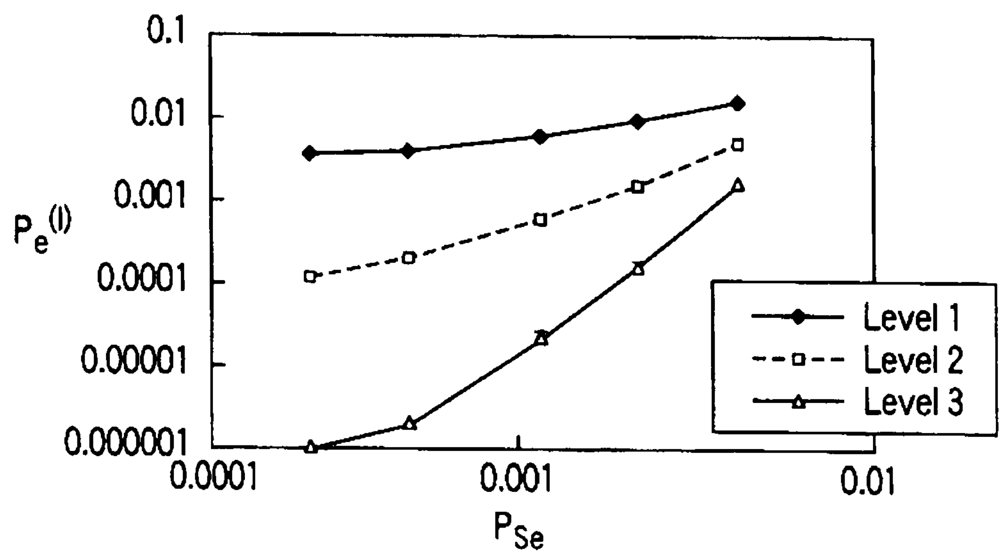
FIG. 7 is a simulation result (vertical axis and horizontal axis are on log scales) in the case of the Steane code reducing errors of state preparation.

In comparison with the Steane code, a threshold of the Knill code is higher. Accordingly, by setting above-mentioned more strict condition to the state preparation of the Steane code, a simulation is executed in the case of reducing errors in state preparation. This simulation result is shown in FIG. 7. Concretely, in preparation of |χ> at level 2, the strict condition is set. As shown in FIG. 7, it is apparent that the threshold is improved as expected.

Figure 8A:
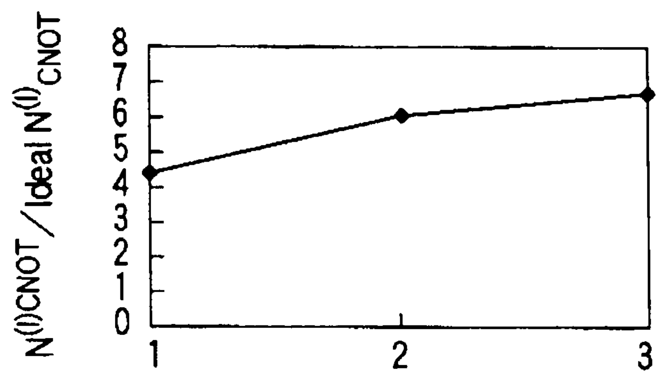
FIGS. 8A, 8B and 8C are simulation results of resources.
Figure 8B:
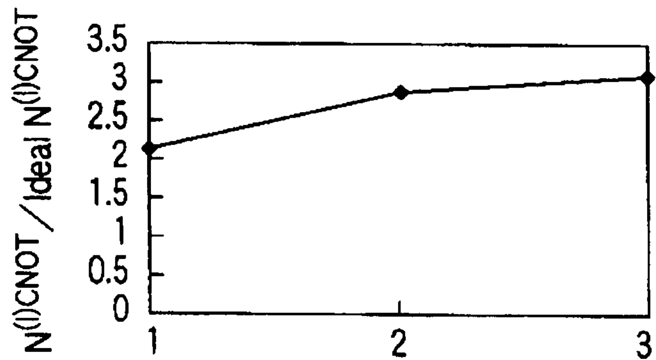
Figure 8C:
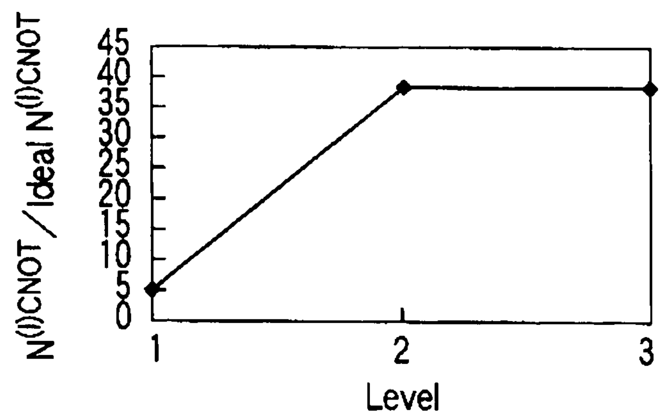

Last, resources are explained. As mentioned-above, it is desired that a high threshold is realized by few resources. As the resource, the number of times $N^{(l)}_{CNOT}$ of physical CNOT gates necessary for preparation of |χ> of level l is considered. From the simulation, an average of $N^{(l)}_{CNOT}$ is estimated. The reason why large resource is necessary to acquire a high threshold is the repeat of processing by postselection. Accordingly, a ratio of $N^{(l)}_{CNOT}$ estimated from above-mentioned simulation to ideal $N^{(l)}_{CNOT}$ (postselection is unnecessary) is calculated. The case of the Steane code (FIG. 5), the case of the Knill code (FIG. 7), and the case of the Steane code using a state preparation method having few errors are FIGS. 8A~8C. FIGS. 8A, 8B and 8C respectively correspond to FIGS. 5, 6 and 7. Here, parameters are set as the following (57). From these results (the ratio is small. When the level is higher, increase rate of the ratio becomes lower.), above-mentioned high threshold can be realized by relative few resources.

$$p_F=0.04,\ p_{Se}=10^{-3},\ p_{Fe}=1,\ p_p=10^{-4},\ p_m=10^{-4} \tag{57}$$

<Rise of Threshold for Failure Probability Using Cluster State>

As mentioned-above, a high threshold 4% for failure probability is acquired. If cluster states are used, the threshold for failure probability can be more heightened. When the cluster state is used, a physical CNOT gate (Correctly speaking, a controlled-phase-flip gate) can be repeatedly performed without breaking the state (explained afterwards). If the cluster state to be used is larger, the number of times to repeat the physical CNOT gate increases and the probability that the physical CNOT gate fails last can be lowered. For example, if a cluster state comprising two physical qubits is connected to each physical qubit of an encoded qubit (detail is explained afterwards), when some physical CNOT gate fails, the physical CNOT gate can be performed more one time, and a probability which the physical CNOT gate fails last is represented as the following (58). Accordingly, if the threshold of the following value (59) in the case of not using cluster states is 4%, the threshold of the following value (59) in the case of connecting above-mentioned cluster states rises as $(4\%)^{1/2}=20\%$. (However, as explained afterwards, a condition of the following value (60) becomes further strict.)

$$p_F^2 \tag{58}$$

$$p_F \tag{59}$$

$$p_{Se} \tag{60}$$

First, a cluster state is explained. The cluster state (or a graph state) is an entangled state corresponding to a graph having vertices connected by edges. By preparing |+> in correspondence with each vertex, the cluster state is defined as a state which a controlled-phase-flip gate is executed for two vertices connected by an edge. (The controlled-phase-flip gate executes nothing to a target qubit in the case of a control qubit |0>, and executes a Z gate to the target qubit in the case of the control qubit |1>. Hereinafter, it is called CZ gate. By combining a CZ gate with Hadamard gates, the CZ gate becomes a CNOT gate, which is one of basic two-qubit gates. Up to this point, CNOT gates are explained as two-qubit gates. However, because Hadamard gates are easily executed, usage of CZ gates instead of CNOT gates is not a problem.) When one qubit of cluster state is connected to one qubit of another arbitrary state, a CZ gate is performed on these qubits.

Next, a quantum gate using the cluster state is explained. Points to understand this operation is as follows.

Figure 9:
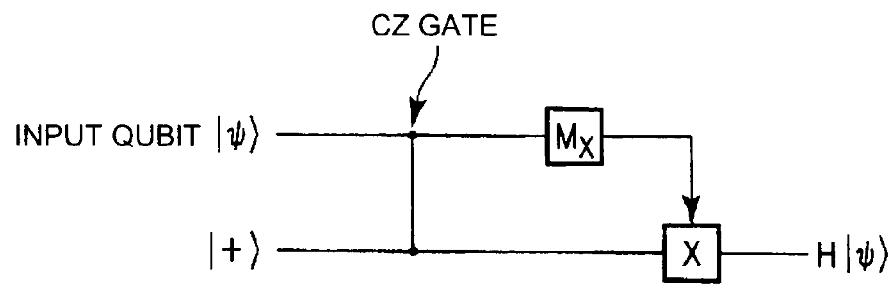
FIG. 9 is a schematic diagram to explain one qubit teleportation.

1. A quantum teleportation can be performed by |+> and a CZ gate (it is called one-qubit teleportation). Refer to FIG. 9. However, the output state is not the original state itself but the original state to which an Hadamard gate is executed.

2. CZ gates are mutually commutable (Execution order may be changed).

3. An operation result a Clifford gate (including a CZ gate and an Hadamard gate) after a Pauli gate is the same as an operation result a Pauli gate after a Clifford gate. (In other words, if $U_p$ is an operator of the Pauli group and $U_c$ is an operator of the Clifford group, an operator $U_{p'}$ of the Pauli group such as $U_cU_p=U_{p'}U_c$ exists. This is the definition of the Clifford group.)

4. When a Z measurement is performed to one qubit in a cluster state, the state after Z measurement is the cluster state excluding the one qubit. However, based on the measurement result, a Z operator is performed to the qubit connected to the above qubit.

Figure 10:
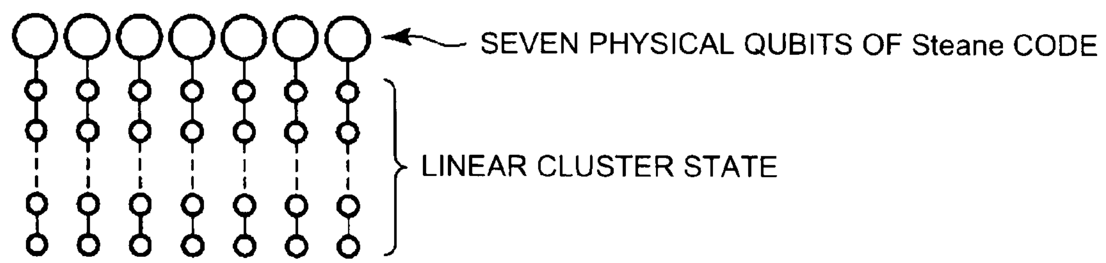
FIG. 10 is one example of the Steane code of level 1 to which seven linear cluster states are connected.

Based on above-explanation, a role of the cluster state in the present invention is explained. In the present invention, in order to repeatedly execute CZ gate, logical qubits to each physical qubit of which a linear cluster state is connected are used for computing as new logical qubits. For example, the Steane code of level 1 to which linear cluster states are connected is shown in FIG. 10. In order to execute a CZ gate to two desired physical qubits, the CZ gate is executed to two head physical qubits of two linear cluster states connected to the two desired physical qubits. If it succeeds, unnecessary physical qubits are deleted by one-qubit teleportation (X measurement), and the state such that a CZ gate is executed to the two desired physical qubits is obtained. (Even if an X measurement is performed to a state to which cluster states are connected, one-qubit teleportation is possible. This is because CZ gates are commutable and the rest cluster state is regarded to be connected after one-qubit teleportation. Furthermore, an Hadamard gate is executed to the output state of one-qubit teleportation. Here, by setting the number of qubits of the linear cluster state as an even number and by executing one-qubit teleportation the even number of times, this Hadamard gate is canceled. In the case of an odd number, by previously executing an Hadamard gate to a head qubit of the linear cluster state, the Hadamard gate is canceled in the same way.)

Figure 11:
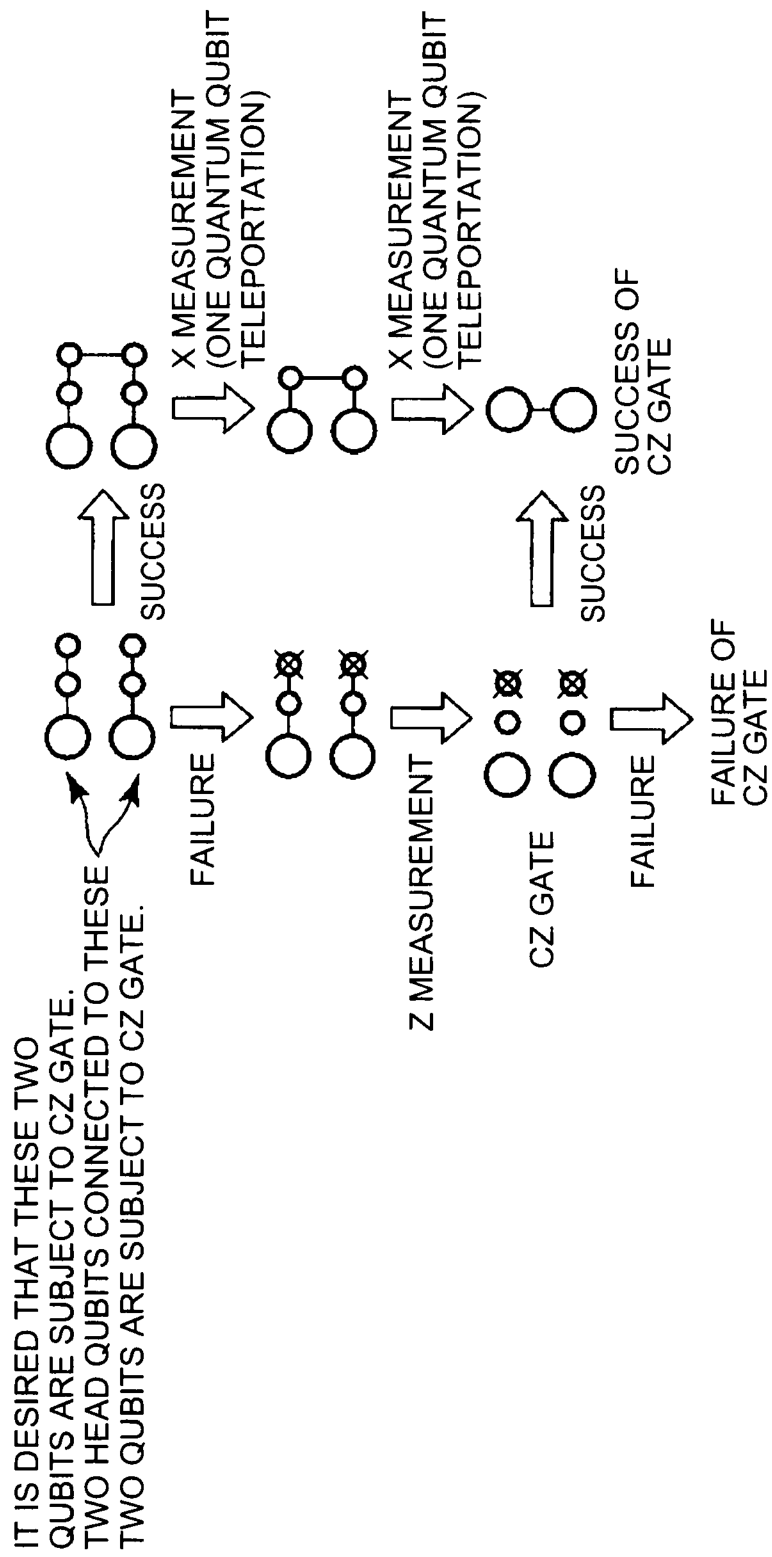
FIG. 11 is a schematic diagram to show processing steps of a CZ gate on states to which linear cluster states are connected.

If the CZ gate fails, a Z measurement is performed to two physical qubits adjacent to two head physical qubits executed by the CZ gate, and the two head physical qubits in the linear cluster state are removed from the encoded qubits. In this way, in the case of failure, a CZ gate can be executed again without breaking the encoded qubits. As to the case that a cluster state having two qubits is connected to each desired physical qubit, the above-mentioned operation is shown in FIG. 11. In general, in the case of connecting the linear cluster state having 2N physical qubits, failures of CZ gates are permitted at the maximum 2N times. As mentioned-above, by using a logical qubit to which linear cluster states are connected, the threshold for failure probability can be heightened.

As to the logical qubit to which linear cluster states are connected, the method for executing Clifford gates (only Z gates, X gates and Hadamard gates are sufficient.) except for CZ gates is explained. Z gates are commutable with CZ gates. Accordingly, a Z gate can be (directly) transversally executed to a physical qubit of an original encoded qubit. As to X gates, a X gate can be (directly) transversally executed to a physical qubit of an original encoded qubit, and, at the same time, a Z gate can be executed to another physical qubit adjacent to the physical qubit in the linear cluster state. (Because of $X_1Z_2U_{cz}=U_{cz}X_1$, where $U_{cz}$ is an operator of a CZ gate, $X_1$ and $Z_2$ are respectively an X operator and a Z operator for two physical qubits to be executed by the CZ gate.) As to Hadamard gates, an Hadamard gate can be executed to a head physical qubit of a linear cluster state connected to a physical qubit of an original encoded qubit (to be executed).

Next, the method for preparing an encoded qubit to which linear cluster states are connected is explained. Simply, when a linear cluster state is connected by a CZ gate after preparing a regular encoded qubit, all CZ gates should succeed, and large resource is necessary (When a regular encoded qubit is prepared, if a linear cluster state is not used, larger resource is necessary.). Furthermore, if the failure probability is reduced by the above-mentioned method after a linear cluster state is connected in the middle of the processing, a length of the linear cluster state is shortened, and an effect of the linear cluster state becomes small in post processing of the state preparation. Accordingly, in the case of using the linear cluster states at state preparation, CZ gates having low failure probability is executed while a predetermined length of the linear cluster state is maintained, i.e., a skillful method is necessary.

Figure 12:
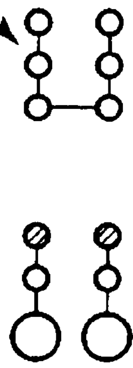
FIG. 12 is a schematic diagram to show processing steps of a CZ gate in the case of preparing encoded qubits to which linear cluster states are connected.
Figure 12:
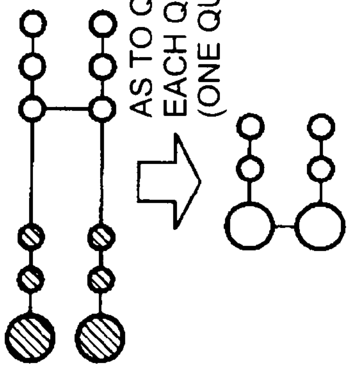
Figure 12:
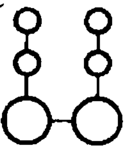

In the present invention, as shown in FIG. 12, in the case of executing CZ gates, a method for connecting a bent one of linear cluster state is used. (Even if CZ gates having high failure probability are used, it is known that the linear cluster states can be effectively generated. Refer to L.-M. Duan and R. Raussendorf, Phys. Rev. Lett. 95, 080503 (2005)) FIG. 12 shows the case that two CZ gates used for connection succeed. If it fails, two adjacent physical qubits are cut off by Z measurements, and the same method is executed again by preparing new linear cluster states. In this way, CZ gates can be executed with high success probability while a length of connected linear cluster state is maintained, and encoded qubits connecting the linear cluster states can be prepared with few resources.

Last, change of threshold of the following value (61) is explained. Because of errors included in linear cluster states, the following value (61) is, effectively, (4N+1) times of the case that the linear cluster states are not used for quantum computing, and (4N+3) times of the case that the linear cluster states are not used for state preparation. Accordingly, the threshold of the following value (61) in the case of connecting the linear cluster states is approximately $(4N+3)^{-1}$ times of the threshold of the following value (61) in the case of not connecting the linear cluster states. As a method for improving this defect, for example, linear cluster states used for state preparation are converted to states having few errors by entanglement distillation (Refer to W. Dur, H. Aschauer, and H.-J. Briegel, Phys. Rev. Lett. 91, 107903 (2003)).

$$p_{Se} \tag{61}$$

[Embodiments]

Hereinafter, embodiments of the present invention are explained.

As a method for operating two-qubit gates having failure information, the above-mentioned Duan method is used (Refer to L.-M. Duan, B. Wanf, H. J. Kimble, Phys. Rev. A 72, 032333 (2005)). As a proposal of a quantum computer using the Duan method, JPA No. 2006-215187 (Kokai) is known. A basic system of a quantum computer of the present embodiment is the same as that of JPA No. 2006-215187 (Kokai) (As explained afterwards, a part related to error-correction is different). Hereinafter, first, Duan's gate method and a suitable condition thereof are explained. Next, a system of the quantum computer of the present invention is explained.

Figure 13:
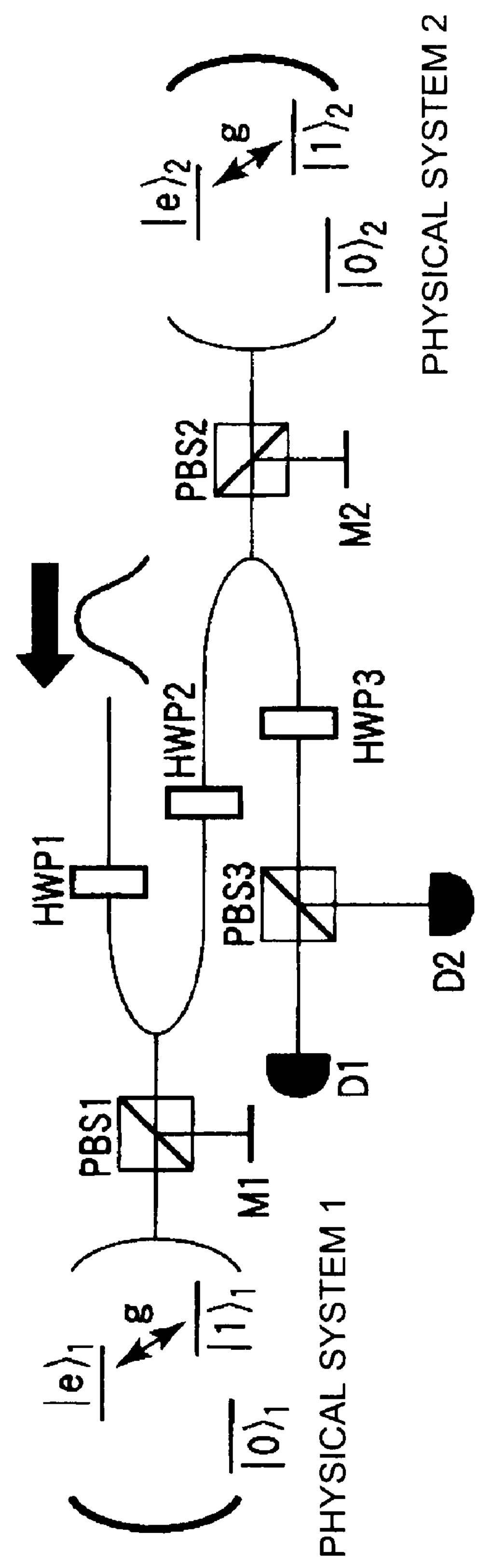
FIG. 13 is a schematic diagram to explain a controlled-phase-flip gate by Duan et al.

FIG. 13 shows a basic set-up of Duan's two-qubit gate. First, operation of ideal case (without photon loss) is explained by referring to FIG. 13. A physical system having two lower states |0> and |1>, and an upper state |e> is located in an optical cavity, and |0> and |1> of the physical system represent a qubit. The lower state and the upper state correspond to lower and upper energy levels, respectively, and the lower state is a lower energy level than the upper state. Furthermore, a cavity mode of the optical cavity resonantly couples to the transition |1>-|1e> of the physical system included in the optical cavity (As shown in FIG. 13, its coupling constant is "g".). This optical cavity is a one-side cavity (It is also called a one-side optical cavity), in which only a mirror to be incident from outside is a partial transmittance mirror and the other mirrors are high reflection mirrors (For example, total reflection mirrors). This optical cavity reflects a light incident from outside reversely. As to Duan's method, by irradiating one photon onto above-mentioned two optical cavities in order, the photon is detected, and a CZ gate is executed to qubits of physical systems in the two optical cavities. Hereinafter, its principle is explained in detail.

The initial state of two physical systems is represented as the following (62). The CZ gate is defined as the following (63). How to execute this operation is explained. First, a single-photon pulse of linear polarization is converted to that of 45-degree polarization. Here, the state of the total system is represented as the following (64).

$$\alpha_{00}|0\rangle_1|0\rangle_2+\alpha_{01}|0\rangle_1|1\rangle_2+\alpha_{10}|1\rangle_1|0\rangle_2+\alpha_{11}|1\rangle_1|1\rangle_2 \tag{62}$$

$$\alpha_{00}|0\rangle_1|0\rangle_2+\alpha_{01}|0\rangle_1|1\rangle_2+\alpha_{10}|1\rangle_1|0\rangle_2+\alpha_{11}|1\rangle_1|1\rangle\rightarrow \alpha_{00}|0\rangle_1|0\rangle_2+\alpha_{01}|0\rangle_1|1\rangle_2+\alpha_{10}|1\rangle_1|0\rangle_2+\alpha_{11}|1\rangle_1|1\rangle_2 \tag{63}$$

$$|\psi_1\rangle=(\alpha_{00}|0\rangle_1|0\rangle_2+\alpha_{01}|0\rangle_1|1\rangle_2+\alpha_{10}|1\rangle_1|0\rangle_2+\alpha_{11}|1\rangle_1|1\rangle_2)\frac{|H\rangle+|V\rangle}{\sqrt{2}} \tag{64}$$

The first two state vectors (62), (63) and (64) represent the states of the physical system 1 and the physical system 2 in FIG. 13, and the last state vector (64) represents the state of the single-photon pulse (H and V represent horizontal polarization and vertical polarization respectively.). In FIG. 13, the photon is divided by a polarization beam splitter PBS1, the photon of horizontal polarization is incident upon the optical cavity having the physical system 1, and the photon of vertical polarization is reflected by a total reflection mirror M1 and returned to PBS1. When the photon of horizontal polarization is incident upon the optical cavity, if the state of the physical system 1 is |0>, the photon is reflected being resonant with the optical cavity. However, if the state of the physical system 1 is |1>, the photon is reflected without being resonant with the optical cavity by vacuum Rabi splitting. As a result, only when the photon is of horizontal polarization and the state of the physical system 1 is |0>, the phase of the photon is shifted by 180 degrees in comparison with that in the other cases. Accordingly, when the photon is returned to PBS1, the state of the total system is represented as follows.

$$|\psi_1\rangle=\frac{(-\alpha_{00}|0\rangle_1|0\rangle_2-\alpha_{01}|0\rangle_1|1\rangle_2+\alpha_{10}|1\rangle_1|0\rangle_2+\alpha_{11}|1\rangle_1|1\rangle_2)|H\rangle}{\sqrt{2}}+\frac{(\alpha_{00}|0\rangle_1|0\rangle_2+\alpha_{01}|0\rangle_1|1\rangle_2+\alpha_{10}|1\rangle_1|0\rangle_2+\alpha_{11}|1\rangle_1|1\rangle_2)|V\rangle}{\sqrt{2}} \tag{65}$$

Next, the photon returned to PBS1 is separated from the optical path of the incident photon by an optical circulator, and incident upon a half-wave plate HWP2. The HWP2 executes an Hadamard gate to the photon. As a result, the state of the total system is represented as the following (66).

$$|\psi_1\rangle=\frac{(-\alpha_{00}|0\rangle_1|0\rangle_2+\alpha_{01}|0\rangle_1|1\rangle_2+\alpha_{10}|1\rangle_1|0\rangle_2+\alpha_{11}|1\rangle_1|1\rangle_2)(|H\rangle-|V\rangle)}{2}+\frac{(\alpha_{00}|0\rangle_1|0\rangle_2+\alpha_{01}|0\rangle_1|1\rangle_2+\alpha_{10}|1\rangle_1|0\rangle_2+\alpha_{11}|1\rangle_1|1\rangle_2)(|V\rangle+|H\rangle)}{2}=(\alpha_{10}|1\rangle_1|0\rangle_2+\alpha_{11}|1\rangle_1|1\rangle_2)|H\rangle+(\alpha_{00}|0\rangle_1|0\rangle_2+\alpha_{01}|0\rangle_1|1\rangle_2)|V\rangle \tag{66}$$

Furthermore, the photon is divided by a polarization beam splitter PBS2, a photon of horizontal polarization is incident upon the optical cavity having the physical system 2, and the photon of vertical polarization is reflected by a total reflection mirror M2 and returned to PBS2. In the same way as the case that the photon is incident upon the optical cavity having the physical system 1, when the photon is returned to PBS2, the state of the total system is represented as the following (67).

$$|\psi_1\rangle = (-\alpha_{10}|1\rangle_1|0\rangle_2 + \alpha_{11}|1\rangle_1|1\rangle_2)|H\rangle + (\alpha_{00}|0\rangle_1|0\rangle_2 + \alpha_{01}|0\rangle_1|1\rangle_2)|V\rangle \quad (67)$$

Last, after HWP3 executes an Hadamard gate to the photon, the photon is separated into horizontal polarization and vertical polarization by PBS3, and photon detectors D1 and D2 detect the photon respectively. Just before the photon is detected, the state of the total system is represented as follows.

$$|\psi_1\rangle = (-\alpha_{10}|1\rangle_1|0\rangle_2 + \alpha_{11}|1\rangle_1|1\rangle_2)\frac{|H\rangle - |V\rangle}{\sqrt{2}} + (\alpha_{00}|0\rangle_1|0\rangle_2 + \alpha_{01}|0\rangle_1|1\rangle_2)\frac{|V\rangle + |H\rangle}{\sqrt{2}} = (\alpha_{00}|0\rangle_1|0\rangle_2 + \alpha_{01}|0\rangle_1|1\rangle_2 + \alpha_{10}|1\rangle_1|0\rangle_2 - \alpha_{11}|1\rangle_1|1\rangle_2)\frac{|V\rangle}{\sqrt{2}} + (\alpha_{00}|0\rangle_1|0\rangle_2 + \alpha_{01}|0\rangle_1|1\rangle_2 - \alpha_{10}|1\rangle_1|0\rangle_2 + \alpha_{11}|1\rangle_1|1\rangle_2)\frac{|H\rangle}{\sqrt{2}} \quad (68)$$

Accordingly, when the photon is detected by D2 (in the case of vertical polarization), the state of the atoms becomes the output state of a CZ gate executed to the input state. When the photon is detected by D1 (in the case of horizontal polarization), by executing a Z gate (the following (69)) to the physical system 1, the state of the atoms becomes the output state of a CZ gate executed to the input state. In this way, the CZ gate is executed.

$$|0\rangle_1 \rightarrow |0\rangle, |1\rangle_1 \rightarrow -|1\rangle_1 \quad (69)$$

Next, the failure probability $P_F$ of the CZ gate by Duan's method is considered. The failure represents the case that the photon is detected by neither D1 nor D2. As causes of this photon loss, the following factors are considered.

(1) Loss in the optical cavity:

(2) Incomplete efficiency of detection of the photon detector:

(3) Incomplete efficiency of photon-output of the single-photon source (a light source to irradiate a single photon):

(4) Loss on the optical path:

Hereinafter, a condition to minimize the loss in the optical cavity is explained.

Quantities to be considered for the loss of the optical cavity is, a coupling constant "g" between the atom and the cavity mode, a relaxation rate "γ" of the excited state of the atom, a decay rate "κ" of the cavity mode through the input mirror of the optical cavity, and a decay rate "$\gamma_c$" of the cavity mode by loss except for the input mirror of the optical cavity. "κ" is freely selectable by selecting the transmittance of the input mirror of the optical cavity. "κ" is determined as the following (70) so that the photonic loss in the case of the atomic state |0> is the same as the photonic loss in the case of the atomic state |1>. Here, "$n_a$" is a dimensionless quantity defined by the following (71) and assumed as the following (72), corresponding to a sufficient large coupling constant (strong coupling). (The photonic loss is the minimum when the loss in the case of the atomic state |0> is same as the loss in the case of the atomic state |1>.) Here, the probability of the photonic loss in the optical cavity is approximately represented as the following (73). Total reflection mirrors M1 and M2 are replaced with a mirror having the following reflection ratio (74) to balance the probability (73). (For example, when an empty one-side cavity same as the optical cavity for the gate is used instead of the mirror, the above-mentioned balance is acquired.) By this operation, in the case of success (the photon is detected), the gate fidelity (a square of an absolute value of an inner product between the ideal output state and the actual output state) is approximately "1". Here, by considering only the loss of the optical cavity, the failure probability of the CZ gate is represented as the following (75).

$$\kappa = \gamma_c\sqrt{2\left(1 + \frac{1}{n_a}\right)} \approx \gamma_c\sqrt{\frac{2}{n_a}} \quad (70)$$

$$n_a = \frac{\gamma\gamma_c}{g^2} \quad (71)$$

$$n_a << 1 \quad (72)$$

$$2\sqrt{2n_a} \quad (73)$$

$$1 - 2\sqrt{2n_a} \quad (74)$$

$$p_F = 4\sqrt{2n_a} \quad (75)$$

The failure probability of the CZ gate can be a little more raised by a little changing the set (while the fidelity approximately "1" is maintained). In order to realize this, M1 is a total reflection mirror, and half-wave plates HWP1 and HWP2 are Hadamard gates (same as the ideal case). However, a polarization state to be incident is not of 45-degree polarization but the following (76) (77), and M2 is not the total reflection mirror but a mirror having a reflectance "η". Here, the photon loss is the minimum, and the failure probability of the CZ gate is represented as the following (78) by considering only the loss of the optical cavity. In this method, M1 and M2 are mirrors having different characteristics. Accordingly, in order to execute a CZ gate between arbitrary two qubits, it is desired that the reflectance of the mirror is changeable. Concretely, by using the one-side cavity instead of the mirror, the reflectance may be changed with adjusting the length of the cavity.

$$\frac{\sqrt{\eta}|H\rangle + |V\rangle}{\sqrt{1+\eta}} \quad (76)$$

$$\eta \equiv 1 - 2\sqrt{2n_a} \quad (77)$$

$$p_F = 3\sqrt{2n_a} \quad (78)$$

Figure 14:
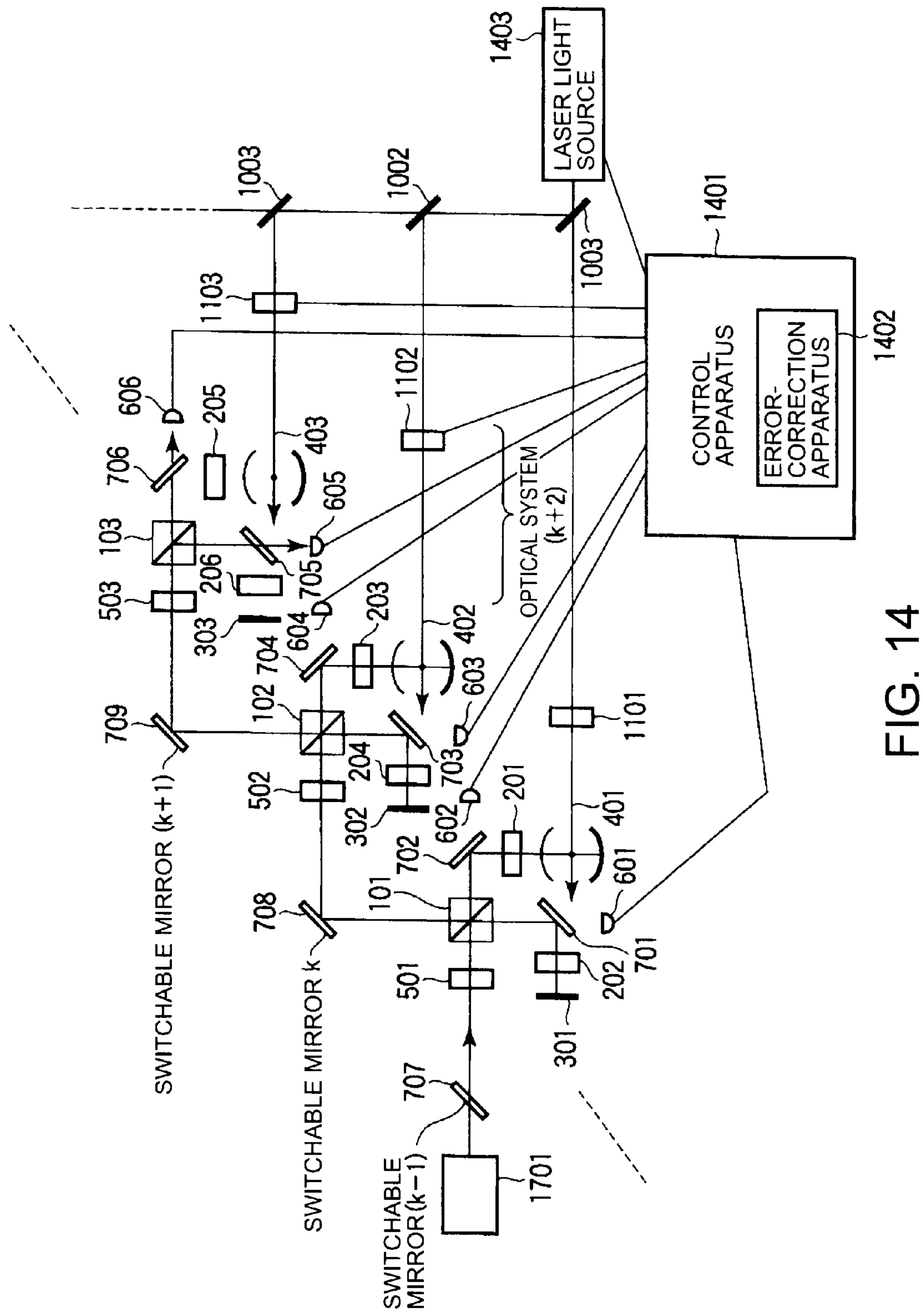
FIG. 14 is a basic system of a quantum computer according to one embodiment.
Figure 15:
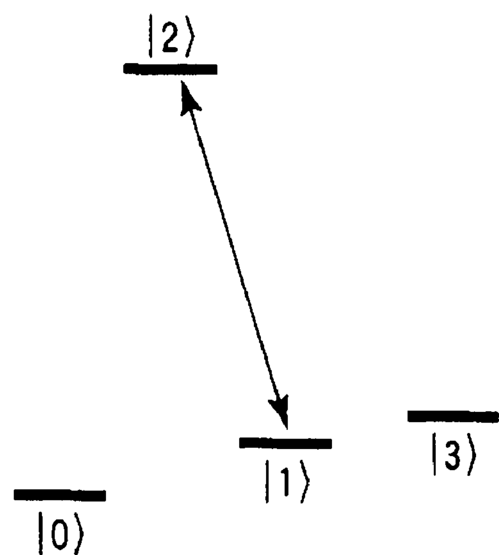
FIG. 15 is a schematic diagram to show the energy levels of the physical system used in FIG. 14.

Next, a quantum computer of the present embodiment is explained by referring to FIG. 14. The quantum computer has a component such that a plurality of same optical systems are arranged, which is an extended one of the optical system of FIG. 13. (In FIG. 13, in order to separate an input optical path to a PBS and an output optical path from the PBS, an optical circulator is used. However, in FIG. 14, as described in JPA No. 2006-215197 (Kokai), a Faraday rotator and a half-wave plate are used.) Each optical system has an optical cavity in which a physical system having energy level structure shown in FIG. 15 is set. Two lower states |0> and |1> of this physical system are used as a quantum qubit, and the transition |1>-|2> resonantly couples to a cavity mode of the optical cavity.

As to the physical system and the optical cavity, a rare-earth ion (For example, $P_r^{3+}$ ion doped into $Y_2S_1O_5$ crystal, which is put into a cryostat with cooling to maintain coherence of quantum state, is used.) in the crystal is used as the physical system. By mirror-polishing opposite surfaces of the crystal, a composed one as the optical cavity can be used (Refer to JPA No. 2006-215197 (Kokai)). Alternatively, one where an atom laser-cooled at very low temperature is trapped into the optical cavity can be used (For example, refer to A. Boca, et al. Phys. Rev. Lett. 93, 233603 (2004)). In these cases, effect of decoherence (probability of memory error) is small, and initialization of qubits, one-qubit gates and measurement of qubits are comparatively easy. Accordingly, the error model assumed in the present invention is applicable well.

Figure 16:
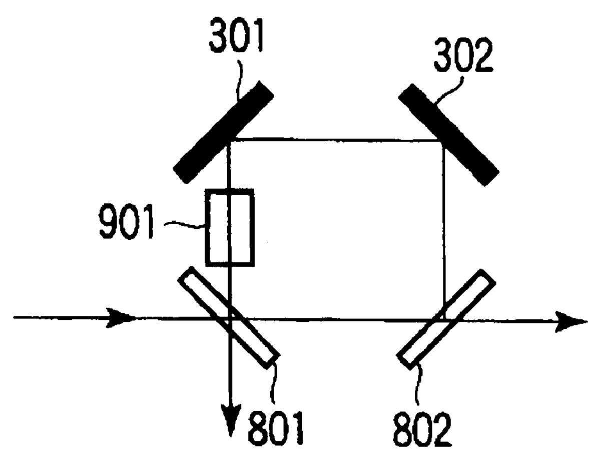
FIG. 16 is a schematic diagram of a ring cavity to realize a switchable mirror used in FIG. 14.

By setting a switchable mirror to switch a high reflection and a high transmittance at each place, a single photon can be directly irradiated onto all optical systems. In addition to this, a photon output from an optical system can be detected by a photon detector of another optical system adjacent to the optical system. The switchable mirror can be implemented by a ring cavity as shown in FIG. 16 (Refer to JAP No. 2006-215197 (Kokai)).

A method for executing the CZ gate based on Duan's method is explained. In order to execute the CZ gate by Duan's method, a photon is irradiated onto a first optical system, an output from the first optical system is incident upon a second optical system, and an output from the second optical system is detected by a photon detector of a third optical system adjacent to the second optical system (Reflection and transmittance of the switchable mirror are previously set so that an output of the photon is guided as above-mentioned.). In this operation, the CZ gate is executed to the qubits of the physical systems in the optical cavity on which the photon is incident (Refer to JPA No. 2006-215197 (Kokai)). Detection result of the photon is used as failure information. If the photon is detected, the failure information is S. If the photon is not detected, the failure information is F.

Reading of the qubit can be executed by irradiating and detecting the photon (Refer to JPA No. 2006-215197 (Kokai)). As to one-qubit gates, by directly irradiating a laser beam from the outside to a physical system in the optical cavity, it is executed with conventional method using another lower state |3>. (Refer to L.-M. Duan, J. I. Cirac, and P. Zoller, Science 292, 1695 (2001), or Z. Kis and F. Renzoni, Phys. Rev. A 65, 032318 (2002))

As to the initialization of the qubit, by directly irradiating a laser beam from the outside to a physical system in the optical cavity, it is executed with optical pumping (Refer to JPA No. 2006-215197 (Kokai)). In order to execute the above-mentioned one-qubit gate and the initialization, the quantum computer of the present invention includes a laser source 1403 to supply laser beams (resonant with each optical transition of the physical system) and modulators (acousto-optical modulators 1101~1103) to control the frequency and the intensity.

As a different point of the quantum computer of the present embodiment from JPA No. 2006-215197, an error-correction apparatus 1402 to correct errors using detection results from the photon detectors is set as shown in FIG. 14. In the error-correction apparatus 1402, by using the photonic detection results (failure information) of a CZ gate during error-correcting teleportation, the measurement result of a logical qubit (encoded qubit having the highest level) is determined with error-correction of the present invention (as above-mentioned in detail). Furthermore, at state preparation, failure information for the state preparation is processed (as above-mentioned in detail).

In order to execute above processing (CZ gate, reading of qubit, one-qubit gate, initialization of qubit, error-correction), the quantum computer of the present invention includes a control apparatus 1401 to operate each unit such as the switchable mirror, the single-photon source, the signal from the photon detector, the laser source, the modulator and the error-correction apparatus.

As mentioned-above, in the present embodiment, by using special two-qubit gates, a high threshold can be realized with relative few procedures. For example, a single photon irradiated for the gate operation is detected, and the photonic detection result is used as failure information. If the photon is detected, the two-qubit gate succeeds with a high probability. If the photon is not detected, the two qubit gate fails with a high probability. Briefly, such a two-qubit gate is utilized.

In the disclosed embodiments, the processing can be performed by a computer program stored in a computer-readable medium.

In the embodiments, the computer readable medium may be, for example, a magnetic disk, a flexible disk, a hard disk, an optical disk (e.g., CD-ROM, CD-R, DVD), an optical magnetic disk (e.g., MD). However, any computer readable medium, which is configured to store a computer program for causing a computer to perform the processing described above, may be used.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

Other embodiments of the invention will be apparent to those skilled in the art from consideration of the specification and embodiments of the invention disclosed herein. It is intended that the specification and embodiments be considered as exemplary only, with the scope and spirit of the invention being indicated by the claims.

What is claimed is:

1. A quantum computing method comprising:

operating a two-qubit gate on two qubits, the two-qubit gate having failure information related to success and failure (the failure information suggesting success is S, the failure information suggesting failure is F);

when the failure information is F(S), defining failure information of the two qubits as F(S);

executing an error-correction by an error-correcting teleportation, using a code to concatenate N-error-correcting code (N: an integral number equal to or larger than one) transversally executing Pauli gates, an Hadamard gate and a controlled-NOT gate (called a CNOT gate);

executing the CNOT gate (called an encoded CNOT gate) to encoded qubits by error-correcting teleportations using |χ>≡|0000>+|0011>+|1101>+|1110>;

when a measurement result of non-encoded qubits (called physical qubits, a gate of the physical qubit is called a physical gate) is processed (at level 0 (1=0), the encoded qubit is replaced with the physical qubit, and the encoded CNOT gate is replaced with a physical CNOT gate) in Bell measurement of the error-correcting teleportation, determining the measurement result and defining the failure information of the encoded qubit of each level by (1)~(4), (1) when all of the encoded qubits of level l(1: an integral number equal to or larger than one) composing an encoded qubit of level (l+1) have failure information S, the measured value of the encoded qubit of level (l+1) is determined by N-error-correction, and failure information of the encoded qubit of level (l+1) is defined as S;

(2) when the number of the encoded qubits of level l with failure information F composing an encoded qubit of level (l+1) is 1~N, the measured value of the encoded qubit of level (l+1) is determined by N-error-correction and ignoring the failure information, and failure information of the encoded qubit of level (l+1) is defined as S;

(3) when the number of the encoded qubits of level lwith failure information F composing an encoded qubit of level (l+1) is (N+1)~2N;

(3-1) when the syndrome as a 2N-erasure-error-correcting code represents no error or that only the qubits having failure information F have errors, the measured value of the encoded qubit of level (l+1) is determined by correcting the error, and failure information of the encoded qubit of level (l+1) is defined as S;

(3-2) when the syndrome as a 2N-erasure-error-correcting code represents errors and that a qubit having failure information S has an error, the measured value of the encoded qubit of level (l+1) is determined by N-error-correction and ignoring the failure information, and failure information of the encoded qubit of level (l+1) is defined as F;

(4) when the number of the encoded qubits of level l with failure information F composing an encoded qubit of level (l+1) is equal to or larger than (2N+1), the measured value of the encoded qubit of level (l+1) is determined by N-error-correction and ignoring the failure information, and failure information of the encoded qubit of level (l+1) is defined as F;

wherein the measurement result of a logical qubit as the encoded qubit of the highest level is determined.

2. The method according to claim 1, further comprising:

in a state preparation of level l, executing a postselection to repeat the two-qubit gates until all of the physical CNOT gates have failure information S;

in the state preparation of level (l'+1) (l': an integral number equal to or larger than one), executing the encoded CNOT gates of level l' by the error-correcting teleportation using |χ>≡|0000>+|0011>+|1101>+|1110>;

when the measurement result of the physical qubits is processed in Bell measurement of the error-correcting teleportation, determining the measurement result and defining the failure information of the encoded qubit of each level by (1)~(4), or by (1')~(4'), (1') when all of the encoded qubits of level l composing an encoded qubit of level (l+1) have failure information S, the measured value of the encoded qubit of level (l+1) is determined by N-error-correction, and failure information of the encoded qubit of level (l+1) is defined as S;

(2') when the number of the encoded qubits of level l with failure information F composing an encoded qubit of level (l+1) is 1~N;

(2'-1) when the syndrome s is zero, nothing is executed; If the syndrome s is not zero and if the error positions represented by the syndrome are the same as the error positions represented by the failure information, the measured value of the encoded qubit of level (l+1) is determined by N-error-correction based on the syndrome, and failure information of the encoded qubit of level (l+1) is defined as S;

(2'-2) when the syndrome s is not zero and if the error positions represented by the syndrome are different from the error positions represented by the failure information, the measured value of the encoded qubit of level (l+1) is determined by N-error-correction and ignoring the failure information, and failure information of the encoded qubit of level (l+1) is defined as F;

(3') when the number of the encoded qubits of level l with failure information F composing an encoded qubit of level (l+1) is (N+1)~2N, the measured value of the encoded qubit of level (l+1) is determined by N-error-correction and ignoring the failure information, and failure information of the encoded qubit of level (l+1) is defined as F;

(4') when the number of the encoded qubits of level l with failure information F composing an encoded qubit of level (l+1) is equal to or larger than (2N+1), the measured value of the encoded qubit of level (l+1) is determined by N-error-correction and ignoring the failure information, and failure information of the encoded qubit of level (l+1) is defined as F;

wherein the measurement result and the failure information of the logical qubit is determined, and when at least one failure information of the logical qubit is F, wherein the postselection is executed to reduce errors included in a state prepared.

3. The method according to claim 1, wherein the error-correcting code is one error-correcting code of Steane using seven qubits.

4. The method according to claim 1, further comprising:

in a preparation |χ>≡|0000>+|0011>+|1101>+|1110> used for execution of the logical CNOT gate, after the last logical CNOT gate is executed at the preparation, executing an error-detecting teleportation to two logical qubits to which the last logical CNOT gate is executed; and executing the postselection to prepare |χ> having few errors.

5. The method according to claim 1, further comprising:

connecting a head physical qubit in 2N physical qubits composing a linear cluster state (an entangled state acquired by sorting 2N physical qubits having |+>=|0>+|1> in one sequence and by executing a controlled-phase-flip gate (called a CZ gate) to all pairs of adjacent two physical qubits) to each physical qubits of an encoded qubit by a CZ gate;

when a CZ gate (called a physical CZ gate) is executed to two encoded qubits, respectively, executing the physical CZ gate to two head physical qubits of two linear cluster states connected to the two encoded qubits;

when the physical CZ gate succeeds, deleting unnecessary physical qubits of the linear cluster state by X measurement and one-qubit teleportation;

when the physical CZ gate fails, separating the two head physical qubits by performing Z measurements on the two physical qubits adjacent to the two head physical qubits in the two linear cluster state, and executing another physical CZ gate to the new two head physical qubits;

wherein failures of the physical CZ gate are permitted at the maximum N times.

6. The method according to claim 5, further comprising:

when the physical CZ gate to prepare a state which is obtained by connecting the linear cluster state having 2N physical qubits to each of the physical qubits of the encoded qubit (two physical qubits to be executed by the physical CZ gate are called physical qubits 1 and 2 in the two linear cluster states connected to two encoded qubits), preparing another linear cluster state having (4N+2) physical qubits (two center physical qubits in the another linear cluster state are called physical qubits 3 and 4);

executing the physical CZ gates to a pair of physical qubits 1 and 3, and a pair of physical qubits 2 and 4;

when the physical CZ gate succeeds, deleting unnecessary physical qubits of the linear cluster state by X measurement and one-qubit teleportation;

when the physical CZ gate fails, executing Z measurement to two physical qubits adjacent to the physical qubits 1 and 2 in the two linear cluster states to separate the physical qubits 1, 2, 3 and 4, preparing a new linear cluster state having (4N+2) physical qubits including the two physical qubits and the another linear cluster state excluding the physical qubits 3 and 4, and executing the physical CZ gate to the two encoded qubits and two center physical qubits in the new physical cluster state;

wherein the state is prepared while failure of the physical CZ gate is permitted at the maximum N times.

7. The method according to claim 1, further comprising:

using, in a physical system having at least two stable lower states |0> and |1>, and one upper state |2>, the lower states |0> and |1> as the qubit;

setting a one-side optical cavity having a cavity mode to be resonant with the transition |1>-|2> of the physical system, at each physical system;

as a two-qubit gate executed to two qubits of two physical systems in a first one-side optical cavity and a second one-side optical cavity, executing a controlled-phase-flip gate to the two qubits, wherein a single photon is radiated to a first half-wave plate, the photon transmitted via the first half-wave plate is incident upon a first polarization beam splitter, the photon transmitted via the first polarization beam splitter is incident upon the first one side optical cavity via a first ¼-wave plate and reflected in reverse direction, photon reflected by the first polarization beam splitter is reflected in reverse direction by a first high reflection mirror via a second ¼-wave plate, the photon reflected by the first one side optical cavity is incident upon the first polarization beam splitter via the first ¼-wave plate and reflected, the photon reflected by the first high reflection mirror is incident upon the first polarization beam splitter via the second ¼-half plate and transmitted, the photon output from the first polarization beam splitter is incident upon a second half-wave plate, the second half-wave plate is executed Hadamard gate having a horizontal polarization and a vertical polarization as the qubit to the photon, the photon transmitted via the second half-wave plate is incident upon a second polarization beam splitter, the photon transmitted via the second polarization beam splitter is incident upon the second one side optical cavity via a third ¼-wave plate and reflected in reverse direction, the photon reflected by the second polarization beam splitter is reflected in reverse direction by a second high reflection mirror via a fourth ¼-wave plate, the photon reflected by the second one side optical cavity is incident upon the second polarization beam splitter via the third ¼-wave plate and reflected, the photon reflected by the second high reflection mirror is incident upon the second polarization beam splitter via the fourth ¼-wave plate and transmitted, the photon output from the second polarization beam splitter is incident upon a third polarization beam splitter via a third half-wave plate, the photon transmitted via the third polarization beam splitter is detected by a first photon detector, the photon reflected by the third polarization beam splitter is detected by a second photon detector, and a one-qubit gate is executed to the two qubits based on detection result of the first detector and the second detector, wherein, by setting failure information S when the photon is detected and setting failure information F when the photon is not detected, the two qubit gate is realized having the failure information.

8. The method according to claim 7, wherein a Faraday rotator and a half-wave plate are used instead of the ¼-wave plate.

9. A quantum computer having a plurality of optical systems, a guidance optical system to guide a photon from one optical system to another optical system, a single photon source to irradiate a single photon onto each optical system, and a polarization measurement system to measure a polarization, the optical system comprising:

a first half-wave plate to incident the single photon from the single photon source;

a first polarization beam splitter to incident a photon transmitted via the first half-wave plate;

a first Faraday rotator and a first half-wave plate to incident a photon transmitted via the first beam splitter;

an optical cavity to incident a photon transmitted via the first Faraday rotator and the first half-wave plate, the optical cavity having one physical system including at least two stable lower states |0> and |1>, one lower state |2>, and an optical cavity mode resonant with a transition |1>-|2> of the physical system;

a second Faraday rotator and a second half-wave plate to incident a photon reflected by the first polarization beam splitter; and a high reflection mirror to incident a photon transmitted via the second Faraday rotator and the second half-wave plate, and reflect the photon in reverse direction, wherein the first polarization beam splitter outputs the photon to the optical system of next stage;

the guidance optical system comprising:

a second half-wave plate;

the polarization measurement system comprising:

a third half-wave plate to incident a photon from the optical system;

a second polarization beam splitter to incident a photon transmitted via the third half-wave plate; and two photon detectors to detect a photon from the second polarization beam splitter;

the two qubit gate having the failure information is executed according to the quantum computing method of claim 8, the quantum computer comprising:

an error-correction apparatus to execute the error-correction.

10. A quantum computer having a plurality of optical systems, a guidance optical system to guide a photon from one optical system to another optical system, a single photon source to irradiate a single photon onto each optical system, and a polarization measurement system to measure a polarization, the optical system comprising:

a first half-wave plate to incident the single photon from the single photon source;

a first polarization beam splitter to incident a photon transmitted via the first half-wave plate;

a first ¼-wave plate to incident a photon transmitted via the first beam splitter;

an optical cavity to incident a photon transmitted via the first ¼-wave plate, the optical cavity having one physical system including at least two stable lower states |0> and |1>, one lower state |2>, and an optical cavity mode resonant with a transition |1>-|2> of the physical system;

a second ¼-wave plate to incident a photon reflected by the first polarization beam splitter; and a high reflection mirror to incident a photon transmitted via the second ¼-wave plate and reflect the photon in reverse direction, wherein the first polarization beam splitter outputs the photon to the optical system of next stage;

the guidance optical system comprising:

a second half-wave plate;

the polarization measurement system comprising:

a third half-wave plate to incident a photon from the optical system;

a second polarization beam splitter to incident a photon transmitted via the third half-wave plate; and two photon detectors to detect a photon from the second polarization beam splitter;

two qubit gate having the failure information is executed according to the quantum computing method of claim 7, the quantum computer comprising:

an error-correction apparatus to execute an error-correction according to the quantum computing method of claim 7.

11. A quantum computing method comprising:

operating a two-qubit gate on two qubits, the two-qubit gate having failure information related to success and failure (the failure information suggesting success is S, the failure information suggesting failure is F);

when the failure information is F(S), defining failure information of the two qubits as F(S);

executing an error-correction by an error-correcting teleportation, using the Knill code (at level l: one-qubit-error-detecting code to encode four qubits into one qubit pair, at level equal to or larger than 2: one-qubit-pair-error-detecting code to encode three qubit pairs into one qubit pair) as an error-correcting code;

executing a CNOT gate (called an encoded CNOT gate) to two encoded qubits by the error-correcting teleportation using $|\chi\rangle \equiv |0000\rangle+|0011\rangle+|1101\rangle+|1110\rangle$;

when a measurement result of non-encoded qubits (called physical qubits, a gate of the physical qubit is called a physical gate) is processed in Bell measurement of the error-correcting teleportation, determining the measurement result and defining the failure information of an encoded qubit pair of each level by (1)~(4), (1) when all failure information of the four physical qubits of level l have failure information S, error-detection is performed; If an error is not detected, the measured value of the encoded qubit pair of level l is determined, and failure information of the encoded qubit pair of level l is defined as S; If the error is detected, failure information of the encoded qubit pair is defined as F;

(2) when the number of four physical qubits of level l with failure information F is one, one physical qubit having the failure information F is regarded as an erasure error; The erasure error of the one physical qubit is corrected, the measured value of the encoded qubit pair of level l is determined, and failure information of the encoded qubit pair of level l is defined as S;

(3) when the number of four physical qubits with failure information F is at least two, failure information of the encoded qubit pair of level l is defined as F;

(4) when all of the three encoded qubit pairs of level l (l: an integral number equal to or larger than one) composing an encoded qubit pair of level (l+1) have failure information S, error detection is performed; If an error is not detected, the measured value of the encoded qubit pair of level (l+1) is determined, and failure information of the encoded qubit pair of level (l+1) is defined as S; If the error is detected, the failure information of the encoded qubit pair of level (l+1) is defined as F;

(5) when the number of the three encoded qubit pairs of level l with failure information F composing an encoded qubit pair of level (l+1) is one, one physical qubit having the failure information F is regarded as an erasure error; The erasure error of the one physical qubit is corrected, a measured value of an encoded qubit pair of level (l+1) is determined, and failure information of the encoded qubit pair of level (l+1) is defined as S;

(6) when the number of the three encoded qubit pairs of level l with failure information F composing an encoded qubit pair of level (l+1) is at least two, failure information of the encoded qubit pair of level (l+1) is defined as F;

wherein the measurement result of a logical qubit pair as the encoded qubit pair of the highest level is determined.

12. The method according to claim 11, further comprising:

in a state preparation of level l, executing a postselection to repeat the two-qubit gates until all of the physical CNOT gates have failure information S;

in the state preparation of level (l'+1) (l': an integral number equal to or larger than one), executing the encoded CNOT gates of level l' by the error-correcting teleportation;

when the measurement result of the physical qubits is processed in Bell measurement of the error-correcting teleportation, determining the measurement result and defining the failure information of the encoded qubit pair of each level by (1)~(6), or by (1')~(6'), (1') when all of the four physical qubits of level l have failure information S, error-detection is performed; If an error is not detected, the measured value of the encoded qubit pair of level l is determined, and failure information of the encoded qubit pair of level l is defined as S; If the error is detected, failure information of the encoded qubit pair of level l is defined as F;

(2') when the number of the four physical qubits of level l with failure information F is one, one physical qubit having the failure information F is regarded as an erasure error; The erasure error of the one physical qubit is corrected, the measured value of the encoded qubit pair of level l is determined, and failure information of the encoded qubit pair of level l is defined as F;

(3') when the number of the four physical qubits of level l with failure information F is at least two, failure information of the encoded qubit pair of level l is defined as F;

(4') when all of the three encoded qubit pairs of level l (l: an integral number equal to or larger than one) composing an encoded qubit pair of level (l+1) have failure information S, error-detection is performed; If an error is not detected, the measured value of the encoded qubit pair of level (l+1) is determined, and failure information of the encoded qubit pair of level (l+1) is defined as S; If the error is detected, failure information of the encoded qubit pair of level (l+1) is defined as F;

(5') when the number of the three encoded qubit pairs of level l with failure information F composing an encoded qubit pair of level (l+1) is one, one qubit pair having the failure information F is regarded as an erasure error; The erasure error of the one qubit pair is corrected, a measured value of an encoded qubit pair of level (l+1) is determined, and failure information of the encoded qubit pair of level (l+1) is defined as F;

(6') when the number of the three encoded qubit pairs of level l with failure information F composing an encoded qubit pair of level (l+1) is at least two, failure information of the encoded qubit pair of level (l+1) is defined as F;

wherein the measurement result and the failure information of the logical qubit pair is determined, and when at least one failure information of the logical qubit pair is F, wherein the postselection is executed to reduce errors included in a state prepared.

13. The method according to claim 11, further comprising:

in a preparation $|\chi\rangle \equiv |0000\rangle+|0011\rangle+|1101\rangle+|1110\rangle$ used for execution of the logical CNOT gate, after the last logical CNOT gate is executed at the preparation, executing an error-detecting teleportation to the two logical qubits to which the last logical CNOT gate is executed; and executing the postselection to prepare $|\chi\rangle$ having few errors.

14. The method according to claim 11, further comprising:

connecting a head physical qubit in 2N physical qubits composing a linear cluster state (an entangled state acquired by sorting 2N physical qubits having $|+\rangle=|0\rangle+|1\rangle$ in one sequence and by executing a controlled-phase-flip gate (called a CZ gate) to all pairs of adjacent two physical qubits) to each physical qubit of an encoded qubit by the CZ gate;

when a CZ gate (called a physical CZ gate) is executed to two physical qubits of two encoded qubits, respectively, executing the physical CZ gate to two head physical qubits of two linear cluster states connected to the two encoded qubits;

when the physical CZ gate succeeds, deleting unnecessary physical qubits of the linear cluster state by X measurement and one-qubit teleportation;

when the physical CZ gate fails, separating the two head physical qubits by performing Z measurements on the two physical qubits adjacent to the two head physical qubits in the two linear cluster state, and executing another physical CZ gate to the new two head physical qubits;

wherein failure of the physical CZ gate is permitted at the maximum N times.

15. The method according to claim 14, further comprising:

when the physical CZ gate to prepare a state which is obtained by connecting the linear cluster state having 2N physical qubits to each of the physical qubits of the encoded qubit (two physical qubits to be executed by the physical CZ gate are called physical qubits 1 and 2 in the two linear cluster states connected to two encoded qubits), preparing another linear cluster state having (4N+2) physical qubits (two center physical qubits in the another linear cluster state are called physical qubits 3 and 4);

executing the physical CZ gate to a pair of physical qubits 1 and 3, and a pair of physical qubits 2 and 4;

when the physical CZ gate succeeds, deleting unnecessary physical qubit of the linear cluster state by X measurement and one qubit teleportation;

when the physical CZ gate fails, executing Z measurement to two physical qubits adjacent to the physical qubits 1 and 2 in the two linear cluster state to separate the physical qubits 1, 2, 3 and 4, preparing a new linear cluster state having (4N+2) physical qubits including the two physical qubits and the another linear cluster state excluding the physical qubits 3 and 4, and executing the physical CZ gate to the two encoded qubits and two center physical qubits in the new physical cluster state;

wherein the state is prepared while failure of the physical CZ gate is permitted at the maximum N times.

16. The method according to claim 11, further comprising:

using, in a physical system having at least two stable lower states $|0\rangle$ and $|1\rangle$, and one upper state $|2\rangle$, the lower states $|0\rangle$ and $|1\rangle$ as the qubit;

setting a one-side optical cavity having a cavity mode to be resonant with the transition $|1\rangle$-$|2\rangle$ of the physical system, at each physical system;

as two qubit gate executed to two qubits of two physical systems in a first one-side optical cavity and a second one-side optical cavity, executing a controlled-phase-flip gate to the two qubits, wherein a single photon is radiated to a first half-wave plate, the photon transmitted via the first half-wave plate is incident upon a first polarization beam splitter, the photon transmitted via the first polarization beam splitter is incident upon the first one side optical cavity via a first ¼-wave plate and reflected in reverse direction, the photon reflected by the first polarization beam splitter is reflected in reverse direction by a first high reflection mirror via a second ¼-wave plate, the photon reflected by the first one side optical cavity is incident upon the first polarization beam splitter via the first ¼-wave plate and reflected, the photon reflected by the first high reflection mirror is incident upon the first polarization beam splitter via the second ¼-half plate and transmitted, the photon output from the first polarization beam splitter is incident upon a second half-wave plate, the second half-wave plate is executed Hadamard gate having a horizontal polarization and a vertical polarization as the qubit to the photon, the photon transmitted via the second half-wave plate is incident upon a second polarization beam splitter, the photon transmitted via the second polarization beam splitter is incident upon the second one side optical cavity via a third ¼-wave plate and reflected in reverse direction, the photon reflected by the second polarization beam splitter is reflected in reverse direction by a second high reflection mirror via a fourth ¼-wave plate, the photon reflected by the second one side optical cavity is incident upon the second polarization beam splitter via the third ¼-wave plate and reflected, the photon reflected by the second high reflection mirror is incident upon the second polarization beam splitter via the fourth ¼-wave plate and transmitted, the photon output from the second polarization beam splitter is incident upon a third polarization beam splitter via a third half-wave plate, the photon transmitted via the third polarization beam splitter is detected by a first photon detector, the photon reflected by the third polarization beam splitter is detected by a second photon detector, and a one-qubit gate is executed to the two qubits based on detection result of the first detector and the second detector, wherein, by setting failure information S when the photon is detected and setting failure information F when the photon is not detected, the two qubit gate is realized having the failure information.

17. The method according to claim 16, wherein a Faraday rotator and a half-wave plate are used instead of the ¼-wave plate, or a first optical circulator is used at input side of the first polarization beam splitter instead of the first ¼-wave plate and the second ¼-wave plate, and a second optical circulator is used at input side of the second polarization beam splitter instead of the third ¼-wave plate and the fourth ¼-wave plate.

* * * * *